United States Patent [19]

Fetcenko et al.

[11] Patent Number: 5,104,617
[45] Date of Patent: * Apr. 14, 1992

[54] CATALYTIC HYDROGEN STORAGE ELECTRODE MATERIALS FOR USE IN ELECTROCHEMICAL CELLS AND ELECTROCHEMICAL CELLS INCORPORATING THE MATERIALS

[75] Inventors: Michael A. Fetcenko, Royal Oak; Stanford R. Ovshinsky, Bloomfield Hills, both of Mich.

[73] Assignee: Energy Conversion Devices, Inc., Troy, Mich.

[*] Notice: The portion of the term of this patent subsequent to Mar. 17, 2009 has been disclaimed.

[21] Appl. No.: 515,020

[22] Filed: Apr. 26, 1990

[51] Int. Cl.$^5$ .................. H01M 4/38; C22C 30/00
[52] U.S. Cl. .................. 420/588; 420/900; 429/57
[58] Field of Search ............ 429/101, 57; 420/900, 420/588, 589

[56] References Cited

U.S. PATENT DOCUMENTS 4,728,586  3/1988  Venkatesan ............... 429/101 X
4,849,205  7/1989  Hong ..................... 420/900 X

FOREIGN PATENT DOCUMENTS 3023770 11/1983 Fed. Rep. of Germany ...... 420/900

Primary Examiner—Stephen J. Kalafut
Attorney, Agent, or Firm—Marvin S. Siskind

[57] ABSTRACT

Disclosed is a reversible, electrochemical cell having a high electrochemical activity, hydrogen storage negative electrode. The negative electrode is formed of a reversible, multicomponent, multiphase, electrochemical hydrogen storage alloy. The hydrogen storage alloy is capable of electrochemically charging and discharging hydrogen in alkaline aqueous media. In one preferred exemplification the hydrogen storage alloy is a member of the family of hydrogen storage alloys, deriсоветiced from the V-Ti-Zr-Ni and V-Ti-Zr-Ni-Cr alloys in which the V, Ti, Zr, Ni and Cr are partially replaced by one or more modifiers, and the alloy has the composition:

$$(V_{y'-y}Ni_yTi_{x'-x}Zr_xCr_z)_aM'_bM''_cM_d^{iv}$$

where $x'$ is between 1.8 and 2.2, $x$ is between 0 and 1.5, $y'$ is between 3.6 and 4.4, $y$ is between 0.6 and 3.5, $z$ is between 0.00 and 1.44, a designates that the V-Ni-Ti-Zr-Cr component, as a group is from 70 to 100 atomic percent of the alloy, b,c,d,e, ..., are the coefficients on the modifiers, and M', M'', M$^{iii}$, and M$^{iv}$ are modifiers which may be individually or collectively up to 30 atomic percent of the total alloy. The modifiers, M', M'', M$^{iii}$, and M$^{iv}$ are chosen from Al, Mn, Mo, Cu, W, Fe, Co, and combinations thereof.

5 Claims, 12 Drawing Sheets

CATALYTIC HYDROGEN STORAGE ELECTRODE MATERIALS FOR USE IN ELECTROCHEMICAL CELLS AND ELECTROCHEMICAL CELLS INCORPORATING THE MATERIALS

CROSS-REFERENCE TO RELATED APPLICATIONS

This application is a continuation-in-part of U.S. patent application Ser. No. 441,489 filed Nov. 24, 1989 entitled "Catalytic Hydrogen Storage Electrode Materials For Use In Electrochemical Cells And Electrochemical Cells Incorporating the Materials."

FIELD OF THE INVENTION

The present invention relates to rechargeable electrochemical cells. More particularly, the invention relates to rechargeable cells and batteries having negative electrodes formed of multicomponent, multiphase, electrochemical hydrogen storage alloys. The negative electrodes are characterized by superior electrochemical properties, i.e., high cycle life, high capacity, high drain rates, high midpoint voltages, low self-discharge, and enhanced low temperature behaviorssures.

BACKGROUND OF THE INVENTION

A. Principles of Operation

Secondary cells using rechargeable hydrogen storage negative electrodes are an environmentally non-threatening, high energy density electrochemical power source. These cells operate in a different manner than lead acid, nickel-cadmium or other battery systems. The rechargeable hydrogen storage electrochemical cell or battery utilizes a negative electrode that is capable of reversibly electrochemically storing hydrogen. These cells usually employ a positive electrode of nickel hydroxide material, although other positive materials may be used. The negative and positive electrodes are spaced apart in an alkaline electrolyte, which may include a suitable separator, i.e., a membrane, therebetween.

Upon application of an electrical potential across the cell, the negative electrode material (M) is charged by the electrochemical absorption of hydrogen and the electrochemical evolution of hydroxyl ion:

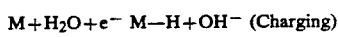

$$M + H_2O + e^- \rightarrow M-H + OH^- \text{ (Charging)}$$

Upon discharge, the stored hydrogen is released to form a water molecule and evolve an electron:

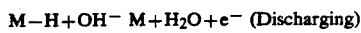

$$M-H + OH^- \rightarrow M + H_2O + e^- \text{ (Discharging)}$$

In the reversible (secondary) cells of the invention, the reactions are reversible.

The reactions that take place at the positive electrode of a secondary cell are also reversible. For example, the reactions at a conventional nickel hydroxide positive electrode as utilized in a hydrogen rechargeable secondary cell are:

$$Ni(OH)_2 + OH^- \rightarrow NiOOH + H_2O + e^- \text{ (Charging)},$$

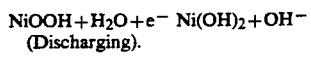

$$NiOOH + H_2O + e^- \rightarrow Ni(OH)_2 + OH^- \text{ (Discharging)}.$$

A secondary cell utilizing an electrochemically rechargeable hydrogen storage negative electrode offers important advantages over conventional secondary cells and batteries, e.g., nickel-cadmium cells, lead-acid cells, and lithium cells. First, the hydrogen storage secondary cells contain neither cadmium nor lead nor lithium; as such they do not present a consumer safety or environmental hazard. Secondary, electrochemical cells with hydrogen storage negative electrodes offer significantly higher specific charge capacities than do cells with lead or cadmium negative electrodes. As a result, a higher energy density is possible with hydrogen storage cells than with conventional systems, making hydrogen storage cells particularly suitable for many commercial applications.

B. BACKGROUND OF THE INVENTION

$AB_2$ Type Hydrogen Storage Alloys

The hydrogen storage art provides a rich storehouse of hydrogen storage alloys, both electrochemical and thermal. One type of these alloys are exemplified by the $AB_2$ type hydrogen storage alloys. The prior art references teach basic $C_{14}$ and $C_{15}$ type Laves phase $AB_2$ materials with (1) one or more of Ti, Zr, and Hf, and (2) Ni, generally with one or more additional metals. However, there is no teaching in any of the prior art references of either the local metallurgical, chemical, or electrochemical relationships between the various individual metals that partially substitute for Ni, or that partially substitute for the Ti, Zr, and/or Hf. Nor is there any teaching of local, i.e., intra-phase, compositions and the effect of local, i.e., intra-phase, compositional differences on catalytic properties, generally, and key determinants of catalytic properties, such as the electron work function.

The earliest teachings of $AB_2$ type hydrogen storage materials are thermal hydrogen storage alloys. In thermal hydrogen storage alloys the driving forces for hydriding and dehydriding are thermal and pressure driving forces. By way of contrast, electrochemical hydrogen storage alloys are hydrided and dehydrided by electron transfer processes in ionic media.

Early reported members of the $AB_2$ class were the binaries $ZrCr_2$, $ZrV_2$, and $ZrMo_2$. These were reported to be thermal hydrogen storage alloys by A. Pebler and E. A. Gulbransen, *Transactions of the Metallurgical Society*, 239, 1593–1600 (1967).

Another early member of this class is the Mg-Ni thermal hydrogen storage alloy described by J. J. Reilly and R. H. Wiswall, "The Reaction of Hydrogen With Alloys of Magnesium and Nickel and the Formation of $Mg_2NiH_4$" *Inorganic Chem.* (1968) 7, 2254. These early alloys of Reilly and Wiswell were thermal hydrogen storage alloys, which hydrided and dehydrided by pressure and temperature driven processes, and not by electron transfer with an external circuit.

F. H. M. Spit, J. W. Drivjer, and S. Radelar describe a class of ZrNi binary thermal hydrogen storage alloys in "Hydrogen Sorption By The Metallic Glass $Ni_{64}Zr_{36}$ And By Related Crystalline Compounds," *Scripta Metallurgica*, 14, (1980) 1071–1076. In this paper Spit et al describe the thermodynamics of gas phase hydrogen adsorption and desorption in the $ZrNi_2$ binary system.

Subsequently, in F. H. M. Spit, J. W. Drivjer, and S. Radelar, "Hydrogen Sorption in Amorphous Ni(Zr,Ti) Alloys", *Zeitschrift Fur Physikaisch Chemie Neue Folge Bd.*, 225–232 (1979) reported the gas phase hydrogen sorption and desorption kinetics of thermal hydrogen storage processes in $Zr_{36.3}Ni_{63.7}$ and $Ti_{29}Zr_9Ni_{62}$.

Zirconium-manganese binary thermal hydrogen storage alloys were disclosed, for example, in F. Pourarian, H. Fujii, W. E. Wallace, V. K. Shina, and H. Kevin Smith, "Stability and Magnetism of Hydrides of Nonstoichiometric $ZrMn_2$", *J. Phys. Chem.*, 85, 3105-3111. Porarian et al describe a class of nonstoichiometric hydrides of the general formula $ZrMn_{2+x}$ where $x=0.6$, 0.8, and 1.8. (ZrTi)-manganese ternary hydrogen storage alloys were described by H. Fujii, F. Pourarian, V. K. Sinha, and W. E. Wallace, "Magnetic, Crystallographic, and Hydrogen Storage Characteristics of $Zr_{1-x}Ti_xMn_2$ Hydrides", *J. Phys. Chem.*, 85, 3112.

Manganese-nickel binary thermal hydrogen storage alloys were described for thermal hydrogen storage in automotive applications by H. Buchner in "Perspectives For Metal Hydride Technology", *Prog. Energy Combust. Sci.*, 6, 331-346.

Ternary zirconium, nickel, magnanese thermal hydrogen storage alloys are described in, for example, A. Suzuki and N. Nishimiya, "Thermodynamic Properties of $Zr(Ni_xMn_{1-x})_2-H_2$ Systems," *Mat. Res. Bull.*, 19, 1559-1571 (1984). Suzuki et al describe the system $Zr(Ni_xMn_{1-x})_2$ where $x=0.2$, 0.5, and 0.8.

Six component thermal hydrogen storage alloys of the general $AB_2$ type are described in German Patentschrift DE 31-51-712-C1 for Titanium Based Hydrogen Storage Alloy With Iron And/or Aluminium Replacing Vanadium and Optionally Nickel, based upon German Application DE 31-51-712 filed Dec. 29, 1981, of Otto Bernauer and Klaus Ziegler, and assigned to Daimler Benz AG. The key teaching of Bernauer et al is that the vandium in a six component Ti-Zr-Mn-Cr-V-Ni alloy can be partially replaced by Fe and/or Al to give a lower cost thermal hydrogen storage alloy. A secondary teaching is that the Ni can be partially replaced by Fe to further reduce the cost of the alloy. The key teaching is that Fe an be used in the alloy without hurting the properties.

Bernauer et al describe a thermal hydrogen storage alloy having the composition $Ti_{1-a}Zr_aMn_{2-x}Cr_{x-y}(V_zNi_{1-z})_y$, where a is from 0 to 0.33, x is from 0.2 to 1.0, y is between 0.2 and x, and z is from 0.3 to 0.9. Bernauer et al disclose that the Ni is partially replaceable by Co and/or Cu, and from 1 to 5 atomic percent of the Ti is replaceable by strong oxygen getters, such as lanthanum and other rare earths. It is further disclosed that up to 20 atomic percent of the vanadium is replaceable by Fe, and up to 15 atomic percent of the vanadium is replaceable by Al, with the provision that no more than 30 atomic percent of the V can be replaced by Fe and Al. It is further disclosed that Ni atoms can be replaced by Fe atoms.

A further related teaching relating to multi-component thermal hydrogen storage alloys of this general type is in German Patentschrift DE 30-23-770-C2 for Titanium Manganese Vanadium Based Laves Phase Material With Hexagonal Structure, Used As Hydrogen Storage Material, based upon German Application DE 30-23-770 filed Jun. 25, 1980, and 30-31-471 filed Aug. 21, 1980 of Otto Bernauer and Klaus Ziegler, and assigned to Daimler Benz AG. The key teaching of Bernauer et al is that the nickel in a six component Ti-Zr-Mn-Cr-V-Ni alloy can be partially replaced by Co and/or Cu to give a lower cost thermal hydrogen storage alloy.

The alloys disclosed in DE30-23-770 are $Ti_{1-a}Zr_aMn_{2-x}Cr_{x-y}(V_zM_{1-z})_y$ in which M is one or more of Ni, Co, and Cu, a is from 0.0 to 0.3, x is from 0.2 to 1.0, y is between 0,2 and the value of x, and the ratio of vanadium to total Ni, Co, and Cu is between 9:1 and 3:2.

Matsushita Electric Industrial Co.'s U.S. Pat. Nos. 4,153,484 and 4,228,145, to Gamo, Moriwaki, Yamashita, and Fukuda, both entitled *Hydrogen Storage Material*, disclose a class of C14 type Laves phase materials for the thermal storage of hydrogen. That is, the materials are hydrided by gaseous hydrogen and dehydrided by evolving gaseous hydrogen. The disclosed C14 materials have a hexagonal crystal structure with an a lattice dimension of 4.80 to 5.10 Angstroms and a c lattice dimension of 7.88 to 8.28 Angstroms. Gamo et al.'s disclosed thermal hydrogen storage alloys contain Ti-Zr-Mn, optionally with one or more of Mo, or Cu. This family of thermal hydrogen storage patents requires the presence of Mn, is silent as to V, Cr, or Ni, and contains no teaching of additional materials.

Other Laves phase materials are disclosed in Matsushita's U.S. Pat. No. 4,160,014 of Takaharu Gamo, Yoshio Moriwaki, Toshio Yamashita, and Masataro Fukuda for *Hydrogen Storage Material*, claiming the benefit of Japanese Patent Application 52JP-054140 filed May 10, 1977. Gamo et al disclose an $AB_a$ type thermal hydrogen storage material where A is at least 50 atomic percent Ti, balance one or more of Zr or Hf, B is at least 30 atomic percent Mn, balance one or more of Cr, V, Nb, Ta, Mo, Fe, Co, Ni, Cu, and rare earths, and a is from 1.0 to 3.0.

Another class of thermal hydrogen storage materials is disclosed in U.S. Pat. No. 4,163,666 of D. Shaltiel, D. Davidov, and I. Jacob for *Hydrogen Charged Alloys of $Zr(A_{1-x}B_x)_2$ And Method of Hydrogen Storage*. Shaltiel et al. disclose the ternary $Zr(A_{1-x}B_x)_2$ where A is or more of V, Mn, or Cr, and B is one or more of Fe or Co. The material is disclosed as a thermal hydrogen storage alloy.

Other prior art Laves phase-type hydrogen storage alloys are shown, for example, in Matsushita Electric Industrial Co. Ltd., U.S. Pat. No. 4,195,989 of Takaharu Gamo, Yoshio Moriwaki, Toshio Yamashita, and Masataro Fukuda for *Hydrogen Storage Material*, claiming the benefit of Japanese Patent Applications 53JP-044677 filed Apr. 14, 1978, and 52JP-130049 filed Oct. 28, 1977. Gamo et al disclose a Laves phase hexagonal Ti-Mn-M alloy where M is one or more of V, Cr, Fe, Co, Ni, Cu, and Mo, with the a parameter being between 4.86 and 4.90 Angstroms, and the c parameter being between 7.95 and 8.02 Angstroms. These materials are disclosed to be thermal hydrogen storage materials.

U.S. Pat. No. 4,397,834 of M. Mendelsohn and D. Gruen for "Method of Gettering Hydrogen Under Conditions of Low Pressure" describes a ternary Zr-V-Cr hydrogen storage alloy. The alloy, having the formula represented by $Zr(V_{1-x}Cr_x)_2$, where x is from 0.01 to 0.90, is used to getter or scavenge hydrogen gas.

In U.S. Pat. No. 4,406,874 of William E. Wallace, F. Pourarian, and V. K. Sinha, for "$ZrMn_2$-Type Alloy Partially Substituted With Cerium/Praseodymium/Neodymium and Characterized By $AB_2$ Stoichiometry" there is disclosed a thermochemical hydrogen storage alloy having the formula $Zr_{x-1}M_xMn_2$ where x is between 0.0 and 0.3, and M is Ce, Pr, or Nd. The material is disclosed to have a hexagonal Laves structure with a crystallographic parameter equal to 5.00 to 5.03 Angstroms, and the c crystallographic parameter equal to 8.20 to 8.26 Angstroms. This alloy is disclosed to be a thermochemical hydrogen storage alloy.

All of the $AB_2$ hydrogen storage alloys described hereinabove are thermal hydrogen storage alloys. Prior art Laves phase-type electrochemical hydrogen storage alloys are shown, for example, in Matsushita Electric Industrial Co. Ltd. Laid Open European Patent Application 0-293 660 based on European Patent Application 88107839.8, filed May 16, 1988, and claiming the priority dates of Japanese Patent Applications 87/119411, 87/190698, 87/205683, 87/216898, and 87/258889, and the following Japanese patents of Matsushita:

1. Japanese Patent 89-102855 issued Apr. 20, 1989, of Moriwaki, Gamo, and Iwaki, entitled HYDROGEN STORING ALLOY ELECTRODE, issued on Japanese Patent Application 87JP-258889, filed Oct. 14, 1987. This patent discloses multi-dimensional hydrogen storage alloys and their hydrides. The alloys are disclosed to be $C_{15}$ Laves phase type materials. The materials have the chemical formula expressed by $A_xB_yNi_z$ where A is Zr either alone or with one or more of Ti, and Hf, and Ti or Hf being 30 atomic percent or less, $x=1.0$, B is at least one of the elements Nb, Cr, Mo, Mn, Fe, Co, Cu, Al and rare earth elements such as La and Ce, $y=0.5$ to 1.0, $z=1.0$ to 1.5, and the sum of $y+z=1.5$ to 2.5. Moriwaki et al disclose that this composition enhances the hydrogen storing ability of the alloy and suppresses the loss of discharge capacity which occurs after repeating charge/discharge cycling (cycle life) of Ti-Ni and Zr-Ni binary systems. There is no teaching of how one choses between Nb, Cr, Mo, Mn, Fe, Co, Cu, Al, La and Ce or the relative proportions within this class of substituents to optimize properties.

2. Japanese Patent 63-284758 of Gamo, Moriwaki, and Iwaki which issued Nov. 22, 1988 entitled HYDROGEN-STORING ELECTRODE on Japanese Patent Application 62-119411 filed May 15, 1987. This patent discloses an alloy which is expressed by a formula $AB_2$, and belongs to the Laves phase of intermetallic compounds, with a cubically symmetric C15 structure and a crystal lattice constant in the range from 6.92-7.70 angstroms. A represents one or more of the elements selected from among Ti, and Zr, B represents one or more elements selected from among, V, and Cr. This patent is silent as to additional substituents or modifiers.

3. Japanese Patent 89-035863 of Gamo, Moriwaki, and Iwaki which issued Jan. 6, 1989 entitled HYDROGEN ABSORBING ELECTRODE on Japanese Patent Application 62-190698 filed Jul. 30, 1987. This patent discloses an alloy of Zr, V, Ni satisfying the general formula $ZrV_zNi_b$, where $a=0.01-1.20$, and $b=1.0-2.5$. However, this teaching of a general formula does not teach specific substituents or modifiers.

4. Japanese Patent 89-048370 of Gamo, Moriwaki, and Iwaki which issued Feb. 22, 1989 entitled HYDROGEN ABSORBING ELECTRODE on Japanese Patent Application 62-205683 filed Aug. 19, 1987. This patent discloses an alloy $ZrMo_aNi_b$ where $a=0.1-1.2$, and $b=1.1-2.5$. This reference does not teach or suggest complex alloys of five or more components.

5. Japanese Patent 89-060961 of Gamo, Moriwaki, and Iwaki which issued Mar. 8, 1989 entitled HYDROGEN ABSORBING ELECTRODE on Japanese Patent Application 62-216898 filed Aug. 31, 1987. This patent discloses a general alloy composition of the formula: $Zr_aV_bNi_cM_d$ where a, b, c, and d are the respective atomic ratios of elements Zr, V, Ni, and M, $a=0.5$ to 1.5, $b=0.01$ to 1.2, $c=0.4$ to 2.5, and $d=0.01$ to 1.8, and $b+c+d=1.2$ to 3.7, and M is one or more elements selected from Mg, Ca, Y, Hf, Nb, Ta, Cr, Mo, Ti, W, Mn, Fe, Co, Pb, Cu, Ag, Au, Zn, Cd, Al, In, Sn, Bi, La, Ce, Mm, Pr, Nd, and Th. This patents, with a list of twenty eight metals plus misch metal, does not teach or even suggest any relationships between the members of the twenty eight metal class of substituents.

The Laid Open European Patent Application of Gamo et al. describes hexagonal C14 Laves phase materials characterized by lattice constants with a from 4.8 to 5.2 Angstroms, and c from 7.9 to 8.3 Angstroms, and cubic C15 Laves phase materials with a lattice constant from 6.92 to 7.20 Angstroms. The materials have the formula $AB_a$ where a is selected from a 16 member list of Zr, Ti, Hf, Ta, Y, Ca, Mg, La, Ce, Pr, Mm, Nb, Nd, Mo, Al, and Si, and B is selected from a 27 member list of Ni, V, Cr, Mn, Fe, Co, Cu, Zn, Al, Si, Nb, Mo, W, Mg, Ca, Y, Ta, Pd, Ag, Au, Cd, In, Sn, Bi, La, Ce and Mm, where A and B are different from each other, and a is from 1.0 to 2.5.

The only guidance provided by Gamo et al. in the selection of the "A" components is that A be Zr, or a mixture of at least 30 atomic percent Zr, balance one or more of Ti, Hf, Si, and Al. The only guidance with respect to the "B" components is that B be V-Ni, Mo-Ni, or V-Ni-M in which M is another metal.

Gamo et al. describe with particularity the subclasses of Zr-V-Ni, Zr-Mo-Ni, and Zr-V-Ni-M (where M is chosen from Mg, Ca, Y, Hf, Nb, Ta, Cr, Mo, Mo, W, Mn, Fe, Co, Pd, Cu, Ag, Au, Zn, Cd, Al, Si, In, Sn, Bi, La, Ce, Mm, Pr, Nd, Th, and Sm). To be noted is that Ti containing materials are excluded from this sub-class, and that Gamo is silent as to any relationships and/or rules regarding the selection of the modifier or modifiers.

Another subclass disclosed by Gamo et al is A'B'Ni (where A' is Zr or at least 30 atomic percent Zr with one or more of Ti, Hf, Al, and Si, and B' is one or more of V, Cr, Mn, Fe, Co, Cu, Zn, Al, Si, Nb, Mo, W, Mg, Ca, Y, Ta, Pd, Au, Ag, Cd, In, Sn, Bi, La, Ce, Mm, Pr, Nd, Th, and Sm. Gamo et al disclose that when A' is Zr, the Zr is preferably in combination with Al or Si, and preferably B' represents two or more elements from the group consisting of Cr, Mn, Fe, and Co. What Gamo fails to disclose is a modified, five or more component material based upon Ti-V-Zr-Ni-Cr, with additional metallic components to increase one or more of cycle life, cell voltage, capacity, discharge rate capability, or low temperature performance.

C. BACKGROUND OF THE INVENTION

Ti-V-Zr-Ni Type Materials

Another suitable class of electrochemical hydrogen storage alloys are the Ti-V-Zr-Ni type active materials for the negative electrode. These materials are disclosed in U.S. Pat. No. 4,551,400 to Krishna Sapru, Kuochih Hong, Michael A. Fetcenko, and Srinivasan Venkatesan, incorporated herein by reference. These materials reversibly from hydrides in order to store hydrogen. The materials of Sapru et al have the generic Ti-V-Zr-Ni composition, where at least Ti, V, and Ni are present with at least one or more of Cr, Zr, and Al. The materials of Sapru et al are multiphase materials, which may contain one or more phases of the $AB_2$ type, with C14 and C15 type structures. One composition disclosed by Sapru is:

$$(TiV_{2-x}Ni_x)_{1-y}M_y$$

where x is between 0.2 and 1.0, y is between 0.0 and 0.2, and M = Al or Zr. Two other illustrative compositions of Sapru et al illustrate the partial substitution of the Ti by one or both of Zr and Cr:

$$Ti_{2-x}Zr_xV_{4-y}Ni_y$$

where zirconium is partially substituted for Ti, x is between 0.0 and 1.5, and y is between 0.6 and 3.5; and $$Ti_{1-x}Cr_xV_{2-y}Ni_y$$

where chromium is partially substituted for Ti, x is between 0.0 and 0.75, and y is between 0.2 and 1.0. It is of course to be understood from the teachings of Sapru et al that both zirconium and chromium may be partially substituted for titanium. Generally, $$(Ti+Zr+Cr)/(V+Ni)$$

is from about 0.40 to about 0.67 to retain the proper Ni morphology in the hydrogen storage alloy.

Sapru et al, however, are silent as to the effects of additives and modifiers beyond those enumerated above, and as to the interactions between these additives and modifiers.

Other Ti-V-Zr-Ni materials may also be used for the rechargeable hydrogen storage negative electrode. One such family of materials are those described in U.S. Pat. No. 4,728,586 of Srini Venkatesan, Benjamin Reichman, and Michael A. Fetcenko for ENHANCED CHARGE RETENTION ELECTROCHEMICAL HYDROGEN STORAGE ALLOYS AND AN ENHANCED CHARGE RETENTION ELECTROCHEMICAL CELL, the disclosure of which is hereby incorporated herein by reference. Venkatesan et al. describe a specific sub-class of the Ti-V-Ni-Zr hydrogen storage alloys comprising titanium, vanadium, zirconium, nickel, and a fifth component, chromium. In a particularly preferred exemplification of Venkatesan et al. the hydrogen storage alloy has the composition $(Ti_{0.33-x}Zr_xV_{0.67-y}Ni_y)_{1-z}Cr_z$ where x is from 0.00 to 0.25, y is from 0.1 to 0.6, and z is an effective amount for electrochemical charge retention, generally greater then 0.05 and less then 0.20, and preferably about 0.07. The alloys may be viewed stoichiometrically as 80 atomic percent of an V-Ti-Zr-Ni moiety and up to 20 atomic percent of Cr, where the ratio of (Ti+Zr+Cr+optional modifiers) to (Ni+V+optional modifiers), is between 0.40 and 0.67. Venkatesan et al, while mentioning the possibility of additives and modifiers beyond the Ti, V, Zr, Ni, and Cr components of the alloys, are silent as to the specific additives and modifiers, and the amounts and interactions of the modifiers and the particular benefits that would be expected therefrom.

A strong motivation for using the above described V-Ti-Zr-Ni family of electrochemical hydrogen storage alloys, as described by Sapru et al., and Venkatesan et al., including the Ti-V-Zr-Ni-Cr hydrogen storage alloys of Venkatesan et al., is the inherently higher discharge rate capability of these materials. Important physical properties in this regard are the substantially higher surface areas for the V-Ti-Zr-Ni materials, and the metal/electrolyte interface. Measured in surface roughness factor (total surface area divided by geometric surface area), the V-Ti-Zr-Ni materials can have roughness factors of about 10,000. The very high surface area plays an important role in the inherently high rate capability of these materials.

The metal/electrolyte interface also has a characteristic surface roughness. The characteristic surface roughness for a given negative electrode electrochemical hydrogen storage material is important because of the interaction of the physical and chemical properties of the host metals, as well as of the alloys and crystallographic phases thereof, in an alkaline environment. The microscopic chemical, physical, and crystallographic parameters of the individual phases within the hydrogen storage alloy material are believed to be important in determining the macroscopic electrochemical characteristics of the hydrogen storage material. Since all of the elements, as well as many alloys and phases thereof, are present throughout the metal, they are also represented at the surfaces and at cracks which form the metal/electrolyte interface.

In addition to the physical nature of the roughened surface, it has been observed that the V-Ti-Zr-Ni materials tend to reach a steady state surface condition and particle size. This steady state surface condition is characterized by a relatively high concentration of metallic nickel. These observations are consistent with a relatively high rate of removal of the oxides of titanium and zirconium from the surface and much lower rate of nickel solubilization. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface, having a conductive and catalytic component, e.g., the metallic nickel, appears to interact with chromium, including chromium metal, chromium compounds, and chromium alloys, in catalyzing various hydride and dehydride reaction steps. To a large extent, many electrode processes, including competing electrode processes, are controlled by the presence of chromium in the hydrogen storage alloy material, as disclosed in the aforementioned U.S. Pat. No. 4,728,586 of Srini Venkatesan, Benjamin Reichman, and Michael A. Fetcenko for ENHANCED CHARGE RETENTION ELECTROCHEMICAL HYDROGEN STORAGE ALLOYS AND AN ENHANCED CHARGE RETENTION ELECTROCHEMICAL CELL, the disclosure of which was incorporated herein by reference.

Another reference which discusses the Ti-V-Zr-Ni class of materials is U.S. Pat. No. 4,849,205 to Kuochih Hong for ΘHYDROGEN STORAGE HYDRIDE ELECTRODE MATERIALS". The Hong patent discloses four separate types of materials, each having four or five components. More particularly, Hong discloses a first material having the formula $Ti_aZr_bNi_cCr_dM_x$, wherein 0.1 a 1.4; 0.1 b 1.3: 0.25 c 1.95; 0.1 d 1.4; 0.0×0.20; a+b+c+d=3; and M=Al, Si, V, Mn, Fe, Co, Cu, Nb and Ln's. In this system, Hong teaches exemplary compounds primarily having four components including Ti-Zr-Ni-Cr, with Cr up to 17% of the material. The one five component exemplary material taught by Hong included Mn in concentrations of approximately 3.2%. No other exemplary five component compounds are taught by Hong. More importantly, the only documented benefit of the exemplary alloys of formula one are their enhanced charge capacity. However, a careful perusal of Table 1 of the Hong reference shows that the inclusion of Mn in the four component material of Formula 1 reduces the charge capacity of those materials. Further, while other benefits of the Formula 1 materials are suggested, i.e., long life cycles, there is no documented evidence of improvemented life cycle, much less any other operational parameter. Thus, one of ordinary skill would in fact be taught away from the use of Mn in a metal-hydride battery system since its inclusion reduces the charge capacity of the materials, and no other apparent benefits thereof result. Additionally, the use of other modifier materials in the basic four component system of Formula 1 is never even considered either in light of charge capacity or any other operational parameter. Therefore, there is no indication of what, if any benefit would result therefrom.

The second class of materials taught by Hong is expressed by the formula $Ti_aCr_bZ_cNi_dV_{3-a-b-c-d}M_x$; wherein $0.1 \le a \le 1.3$; $0.1 \le b \le 1.2$; $0.1 \le c \le 1.3$; $0.2 \le d \le 1.95$; $0.4 \le a+b+c+d \le 2.9$; $0.00 \le x \le 0.2$; and M=Al, Si, Mn, Fe, Co, Cu, Nb, Ln's. In this class, Hong teaches exemplary compounds primarily having five components including Ti-Zr-Ni-Cr-V. The one six component exemplary material taught by Hong includes Cu as a modifier element in concentrations of approximately 3.2%. No other exemplary six component compounds are taught by Hong. More importantly, the only documented benefit of the exemplary alloys of Formula 2, like that of Formula 1, are their enhanced charge capacity. However, a careful perusal of Table 1 of the Hong reference shows that the inclusion of Cu in the five component material of Formula 2 displays reduced charge capacity compared to other five component materials. Further, while other benefits of the Formula 2 materials are suggested, i.e., long life cycles and good rate capability, there is no documented evidence of improvemented life cycle or rate capability, much less any other operational parameter. Thus, one of ordinary skill would in fact be taught away from the use of Cu in a metal-hydride battery system since its inclusion reduces the charge capacity of the materials, and no other apparent benefits thereof result. Additionally, the use of other modifier materials in the basic five component system of Formula 2 is never even considered either in light of charge capacity or any other operational parameter. Therefore, there is no indication of what, if any benefit would result therefrom.

The third class of materials taught by Hong is expressed by the formula: $Ti_aZr_bNi_cV_{3-a-b-c}M_x$ wherein $0.1 \le a \le 1.3$; $0.1 \le b \le 1.3$; $0.25 \le c \le 1.95$; $0.6 \le a+b+c \le 2.9$; $0.0 \le x \le 0.2$; and wherein if x=0, a+b does not equal 1.0, and 0.24 b 1.3. Further, M=Al, Si, Cr, Mn, Fe, Co, Cu, Nb, Ln's. In this class of materials, Hong teaches exemplary compounds primarily having four components including Ti-Zr-Ni-V. The one five component exemplary material taught by Hong included Cu as a modifier element in concentrations of approximately 6.2%. N other exemplary five component compounds are taught by Hong. More importantly, the only documented benefit of the exemplary alloys of Formula 3, are their enhanced charge capacity. However, a careful perusal of Table 1 of the Hong reference shows that the inclusion of Cu in the four component material of Formula 3 displays significantly reduced charge capacity compared to other four component materials disclosed therein. Further, no other benefits of the Formula 3 materials are suggested, either with or without the inclusion of Cu as a modifier component. Thus, there can be no doubt but that one or ordinary skill would avoid the use of Cu in a metal-hydride battery system since its inclusion so significantly reduces the charge capacity of the materials, without contributing any apparent benefits thereof. Additionally, the use of other modifier materials in the basic four component system of Formula 3 is never even considered either in light of charge capacity or any other operational parameter. Therefore, there is no indication of what, if any benefit would result therefrom, nor any reason for the use thereof suggested.

Finally, the fourth class of materials taught by Hong can be represented by the formula: $Ti_aMn_bV_cNi_dM_x$ wherein $0.1 \le a \le 1.6$; $0.1 \le b \le 1.6$; $0.1 \le c \le 1.7$; $0.2 \le d \le 2.0$; $a+b+c+d=3$; $0.0 \le x \le 0.2$; and M=Al, Si, Cr, Mn, Fe, Co, Cu, Nb, Ln's. In this class of materials, Hong teaches exemplary compounds primarily having four components including Ti-Mn-Ni-V. The one five component exemplary material taught by Hong included Co as a modifier element in concentrations of approximately 3.2%. No other exemplary five component compounds are taught by Hong. More importantly, the only documented benefit of the exemplary alloys of Formula 4, are their enhanced charge capacity. However, a careful perusal of Table 1 of the Hong reference shows that the inclusion of Co in the five component material of Formula 4 displays, once again, significantly reduced charge capacity compared to other materials disclosed therein. Further, no other benefits of the Formula 4 materials are suggested, either with or without the inclusion of Co as a modifier component. Thus, there can be no doubt but that one of ordinary skill would avoid the use of Co in a metal-hydride battery system since its inclusion so significantly reduces the charge capacity of the materials, without contributing any apparent benefits thereto. Additionally, the use of other modifier materials in the basic four component system of Formula 4 is never even considered either in light of charge capacity or any other operational parameter. Therefore, there is no indication of what, if any benefit would result therefrom, nor any reason for the use thereof suggested.

It is important to note that while Hong discloses a rather lengthy "laundry list" of possible modifier materials, only two can truly be considered modifiers, Cu and Co since the addition of Mn is clearly taught in the materials of class four. Yet, no benefit is shown from Cu and Co modification. In fact, Hong teaches away from these modifiers since he only demonstrates capacity improvement, and Cu and Co as modifiers substantially reduce capacity. In addition, Hong is silent as to any intended functions of any components. Since the remaining modifier materials disclosed by Hong are neither employed in exemplary compounds, nor are discussed in light of their possible benefits, it can only be concluded that the teaching value of the Hong "laundry list" is minimal at best. This is because one of ordinary skill in the art would not know the possible advantages to be expected from using other ones of said modifier materials or indeed the benefits of employing several modifier materials together in one alloy.

D. BACKGROUND OF THE INVENTION: AB$_5$ TYPE HYDROGEN STORAGE ALLOYS

An alternative class of hydrogen storage alloys are the AB$_5$ type hydrogen storage alloys. These alloys differ in chemistry, microstructure, and electrochemistry from the AB$_2$ and V-Ti-Zr-Ni-Cr types of electrochemical hydrogen storage alloys. Rechargeable batteries utilizing AB$_5$ type negative electrodes are described, for example, in (i) U.S. Pat. No. 3,874,928 to Will for "Hermetically Sealed Secondary Battery with Lanthanum Nickel Electrode", (ii) U.S. Pat. No. 4,214,043 to Van Deuketom for "Rechargeable Electrochemical Cell", (iii) U.S. Pat. No. 4,107,395 to van Ommering et al. for "Overchargeable Sealed Metal Oxide/Lanthanum Nickel Hydride Battery," (iv) U.S. Pat. No. 4,107,405 to Annick Percheron born Guegen et al for "Electrode Materials Based On Lanthanum and Nickel, and Electrochemical Uses of Such Materials," (v) U.S. Pat. No. 4,112,199 to James D. Dunlop et al for "Lanthanum Nickel Hydride-Hydrogen/Metal Oxide Cell," (vi) U.S. Pat. No. 4,125,688 to Bonaterre for "Negative Electrodes for Electric Cells" which discloses Hg modified LaNi$_5$ negative electrodes, (vii) U.S. Pat. No. 4,124,043 to von Dueketom for "Rechargeable Electrochemical Cell" which shows a LaNi$_5$— Ni cell, (viii) U.S. Pat. No. 4,216,274 to Bruning for "Battery With Hydrogen Absorbing Material of the Formula LaM$_5$," which a rechargeable cell with an AB$_5$ type negative electrode of the formula LaM$_5$ where M is Co or Ni; (x) U.S. Pat. No. 4,487,817 to Willems et al., for "Electrochemical Cell Comprising Stable Hydride Forming Material" discloses an AB$_5$ type material where A is chosen from mischmetal, Y, Ti, Hf, Zr, Ca, Th, La, and the rare earths, in which the total of Y, Ti, Hf, and Zr is less than 40% of the A component, and B is chosen from two or more members of the group of Ni, Cu, Co, Fe, and Mn, and at least one member of the group Al, Cr, and Si, (x) U.S. Pat. No. 4,605,603 to Kanda et al for "Hermetically Sealed Metallic Oxide- Hydrogen Battery Using Hydrogen Storage Alloy discloses an AB$_5$ type electrochemical hydrogen storage alloy having the formula MNi$_{5-(x+y)}$Mn$_x$Al$_y$, where M is chosen from the group consisting of lanthanum, lanthanides, and mischmetals, x and y are each between 0.0 and 1.0, and x+y is between 0.2 and 1.0; (xi) U.S. Pat. No. 4,621,034 to Kanda et al for "Sealed Metal Oxide- Hydrogen Storage Cell" discloses a LaNi$_5$ cell where the Ni is partially substituted by Al and/or Mn, (xii) U.S. Pat. No. 4,696,873 to Yagasaki et al for "Rechargeable Electrochemical Cell With A Negative Electrode Comprising A Hydrogen Absorbing Alloy Including Rare Earth Component" discloses AB$_5$ type alloys of the Mischmetal-Ni-Mn-Al type, (xiii) U.S. Pat. No. 4,699,856 to Heuts et al for "Electrochemical Cell" discloses an AB$_5$ type material where A is chosen from mischmetal, Y, Ti, Hf, Zr, Ca, Th, La, and the rare earths, in which the total of Y, Ti, Hf, and Zr is less than 40% of the A component, and B is chosen from two or more members of the group of Ni, Cu, Co, Fe, and Mn, and at least one member of the group Al, Cr, and Si, and including an activator from the group consisting of Ni, Pd, Pt, Ir, and Rh.

It is clear from the above cited documents that the AB$_5$ type alloys are a distinct and specific class of materials. Extensive work on processing techniques and electrode and cell design demonstrate that the singularity of AB$_5$ technology, that is, that the AB$_5$ technology represents a separate field of inventive effort from the AB$_2$ and V-Ti-Zr-Ni-Cr classes of alloys. In particular, modifications of AB$_5$ type alloys must be viewed as practical only within the specific AB$_5$ type structure. This is due to the unique metallurgical, electrochemical, and oxidation characteristics of the AB$_5$ class of alloys, especially regarding the use of lanthanum and other rare earths for electrochemical applications. Even for the AB$_5$ alloys, the disclosure of the selection and role of modifiers generally, and even of separate modifiers for specific performance aspects, is vague and nonspecific.

E. BACKGROUND OF THE INVENTION

Deficiencies of the Prior Art

While the prior art hydrogen storage alloys frequently utilized various individual modifiers and combinations of modifiers to enhance properties, there was no clear teaching of the role of an individual modifier, or of the interaction of that modifier with other components of the alloy, or of the effects of the modifiers on properties.

For electrochemical applications, which are substantially different from thermal hydrogen storage applications, one must consider all performance attributes, such as cycle life, high rate discharge, discharge voltage, polarization, self discharge, low temperature capacity, and low temperature voltage.

While it is desirable to have alloys with all of these characteristics, it may also be advantageous to emphasize specific properties for a given application.

The prior art is also deficient in specifying the role of particular modifications, much less in how they work. Frequently with AB$_2$ and AB$_5$ type materials, there is a modifier, X, where X is the rest of the Periodic Chart. Certainly prior art references of this type teach away from specific roles and functions of materials, and provide no practical benefit.

SUMMARY OF THE INVENTION

According to the invention discloses and claimed herein, it has been found that subtle changes in the local chemical and structural order of the Ti-V-Zr-Ni type hydrogen storage alloys, including Ti-V-Zr-Ni-Cr alloys, for example changes in composition within one or more phases occurring through the addition of modifiers, have significant effects on the macroscopic electrochemical properties of negative electrodes incorporating these hydrogen storage alloys. According to the invention, the subtle interactions of individual metallic substituents in the Ti-V-Zr-Ni type structure (including the Ti-V-Zr-Ni-Cr type electrochemical hydrogen storage alloy materials ) are engineered to maximize desirable electrochemical properties of the hydrogen storage alloy, while minimizing undesirable electrochemical properties thereof.

According to the invention disclosed herein, subtle changes in stoichiometry are utilized to effect these macroscopic changes. For example, starting with the composition V$_{22}$Ti$_{16}$Zr$_{16}$Ni$_{39}$Cr$_7$, disclosed in the commonly assigned Venkatesan et al. patent, we have made subtle modifications in the stoichiometry thereof, developing such materials as: (V$_{22}$Ti$_{16}$Zr$_{16}$Ni$_{39}$Cr$_7$)$_{95}$Al$_5$, (V$_{22}$Ti$_{16}$Zr$_{16}$Ni$_{39}$Cr$_7$)$_{95}$Mn$_5$, (V$_{22}$Ti$_{16}$Zr$_{16}$Ni$_{39}$Cr$_7$)$_{95}$Mo$_5$, (V$_{22}$Ti$_{16}$Zr$_{16}$Ni$_{39}$Cr$_7$)$_{95}$Cu$_5$, (V$_{22}$Ti$_{16}$Zr$_{16}$Ni$_{39}$Cr$_7$)$_{95}$W$_5$, $(V_{22}Ti_{16}Zr_{16}Ni_{39}Cr_7)_{95}Fe_5$,
$(V_{22}Ti_{16}Zr_{16}Ni_{39}Cr_7)_{95}Co_5$,
$V_{22}Ti_{16}Zr_{16}Ni_{32}Cr_7Co_7$,
$V_{20.6}Ti_{15}Zr_{15}Ni_{30}Cr_{6.6}Co_{6.6}Mn_{3.6}Al_{2.7}$, and
$V_{22}Ti_{16}Zr_{16}Ni_{27.8}Cr_7Co_{5.9}Mn_{3.1}Al_{2.2}$,
where we have been able to provide enhanced properties therein with respect to the same properties in $V_{22}Ti_{16}Zr_{16}Ni_{39}Cr_7$. Thus, according to our invention, it is possible to do one or more of increasing cycle life (number of charge-discharge cycles at constant drain rate with constant cell capacity), increasing the specific capacity (amp-hours per unit volume or per unit mass), increasing the mid-point voltage at various discharge rates, decreasing the polarization at various discharge rates, increasing the low temperature specific capacity, increasing the low temperature mid-point voltage, decreasing the low temperature polarization, or decreasing the self discharge rate.

While the above description characterizes the macroscopic improvements to the functioning electrode and cell, it is also possible to characterize the more precise function of the modified compositions. For example, an inventive alloy may have one or more of the following functions or attributes:

1. An increase in the active surface area.
2. An increased surface catalytic activity to provide one or more of:
   a. decreased metal oxidation,
   b. enhanced $O_2$ recombination.
3. A surface oxide or film which is:
   a. of controlled thickness, i.e., thicker or, preferably, thinner,
   b. of controlled conductivity, i.e., lower or, preferably, higher conductivity.
4. Decreases corrosion of one or more elements of the alloy.
5. Provides an oxide which allows, catalyzes, or enhances activation.
6. Provide an oxide which precipitates species which:
   a. inhibit corrosion of other species;
   b. decrease oxygen evolution at the positive electrode by increasing the $O_2$ overvoltage thereof;
   c. protect the Ni hydroxide electrode from other corrosion species or mechanisms which can promote oxygen evolution, and/or decrease charge efficiency, and/or lower cell capacity.
7. Increase hydrogen storage capacity and/or hydrogen utilization.
8. Modify intergranular phase composition, structure, or proportions.
9. Improve bulk diffusion in the metal hydride, for example, by modification of phase composition, structure, or proportion.
10. Lower the heat of formation of the M—H bond, thereby increasing the discharge voltage of the metal hydride electrode.
11. Improve bulk diffusion and/or catalysis in the metal hydride through modifications of grain compositions, microstructure, or grain boundaries within the multiphase material.

For example, each of the above identified modifications of $V_{22}Ti_{16}Zr_{16}Ni_{39}Cr_7$ has certain unique advantages with respect thereto. These include:

1. $(V_{22}Ti_{16}Zr_{16}Ni_{39}Cr_7)_{95}Al_5$, modified by the addition of a small amount of aluminum exhibits high specific capacity (342 mAh/g), higher midpoint voltage on discharge, decreased internal resistance in a sealed cell, and enhanced low temperature properties, i.e., low temperature capacity and low temperature mid-point voltage;

2. $(V_{22}Ti_{16}Zr_{16}Ni_{39}Cr_7)_{95}Mn_5$, modified by the addition of a small amount of manganese, exhibits enhanced discharge voltage, high specific capacity (355 mAh/g), improved cycle life, decreased IR loss in a sealed cell, decreased IR loss in a half cell, and enhanced low temperature properties, i.e., enhanced low temperature capacity and low temperature capacity and low temperature mid-point voltage;

3. $(V_{22}Ti_{16}Zr_{16}Ni_{39}Cr_7)_{95}Mo_5$, modified by the addition of a small amount of molybdenum, exhibits decreased IR loss in a half cell, decreased IR loss in a sealed cell, and enhanced mid-point voltage;

4. $(V_{22}Ti_{16}Zr_{16}Ni_{39}Cr_7)_{95}Cu_5$, modified by the addition of a small amount of copper, exhibits high specific capacity (333 mAh/g), improved cycle life, decreased IR loss in a sealed cell, and decreased IR loss in a half cell;

5. $(V_{22}Ti_{16}Zr_{16}Ni_{39}Cr_7)_{95}W_5$, modified by the addition of a small amount of tungsten, exhibits high specific capacity (320 mAh/g), enhanced mid-point voltage, decreased IR loss in a sealed cell, and enhanced low temperature capacity;

6. $(V_{22}Ti_{16}Zr_{16}Ni_{39}Cr_7)_{95}Fe_5$, modified by the addition of a small amount of iron, exhibits high specific capacity (355 mAh/g), vastly enhanced cycle life, decreased half cell IR loss, enhanced mid-point voltage and low temperature properties, such as low temperature capacity and low temperature mid-point voltage;

7. $(V_{22}Ti_{16}Zr_{16}Ni_{39}Cr_7)_{95}Co_5$, modified by the addition of a small amount of cobalt, exhibits high specific capacity (349 mAh/g), improved cycle life, decreased half cell IR loss, decreased sealed cell IR loss, and enhanced low temperature mid-point voltage;

8. $V_{22}Ti_{16}Zr_{16}Ni_{32}Cr_7Co_7$, which is similar to $(V_{22}Ti_{16}Zr_{16}Ni_{39}Cr_7)_{95}Co_5$, above, but clearly demonstrates the importance of the amount of modifier, what the modifier substitutes for, and the particular intent of the modification. This material exhibits high specific capacity (329 mAh/g), vastly improved cycle life, decreased half cell IR loss, and enhanced room temperature mid-point voltage and low temperature mid-point voltage;

9. $V_{20.6}Ti_{15}Zr_{15}Ni_{30}Cr_{6.6}Co_{6.6}Mn_{3.6}Al_{2.7}$ having superior cycle life (including flooded cycle life), enhanced mid-point voltage, enhanced low temperature capacity, enhanced low temperature voltage, decreased sealed cell IR loss, and decreased half cell IR loss.

10. $V_{22}Ti_{16}Zr_{16}Ni_{27.8}Cr_7Co_{5.9}Mn_{3.1}Al_{2.2}$ which exhibits high specific capacity, high midpoint voltage, high voltage at low temperatures, decreased sealed cell IR losses, and vastly improved cycle life.

The negative electrode is formed of the modified, multicomponent, multiphase, reversible electrochemical hydrogen storage alloy of the invention. This electrode is capable of reversibly electrochemically charging and discharging hydrogen in alkaline aqueous media.

The compositionally and structurally modified, high performance, electrochemical hydrogen storage negative electrode is incorporated into a sealed, rechargeable electrochemical cell, i.e., a secondary cell. The electrochemical cell includes a container, e.g., a sealed container, containing positive and negative electrodes in an electrolyte and separated from one another by a separator.

Typically the positive electrode is a nickel hydroxide electrode, and the separator may be non-woven nylon, e.g., with a thickness of about 0.0085 inches. The electrolyte is a concentrated aqueous alkaline electrolyte, e.g., containing at least about 30 percent KOH.

THE FIGURES

The present invention can be more completely understood by reference to the accompanying drawings in which.

DETAILED DESCRIPTION OF THE INVENTION

Figure 1:
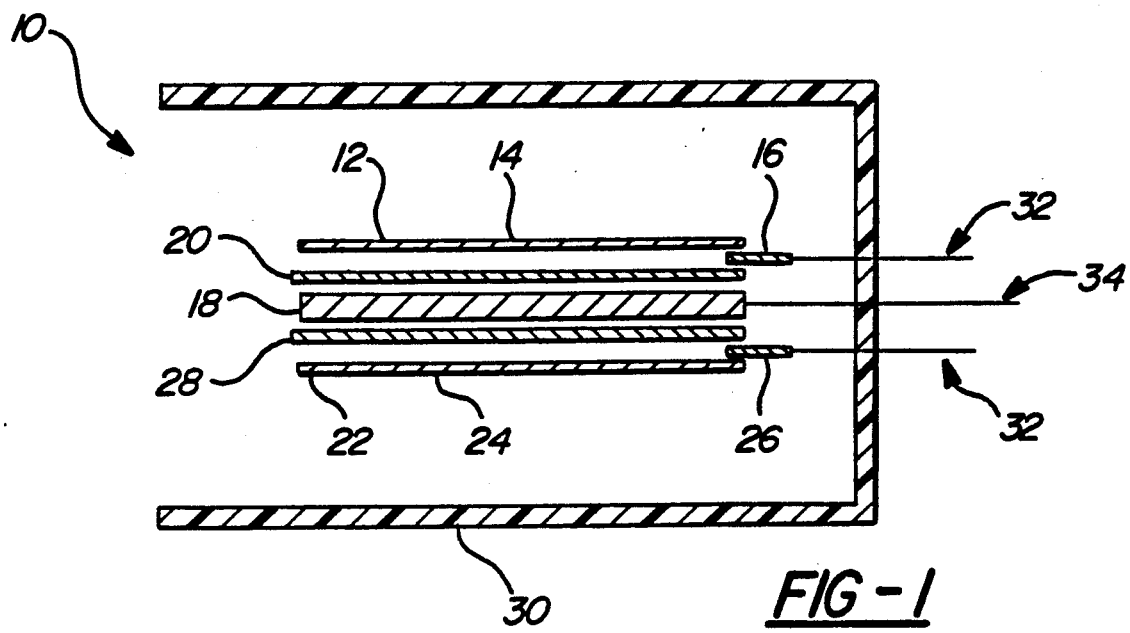
FIG. 1 is a sectional view of a flat electrochemical cell.

In accordance with the present invention, there is provided a family of hydrogen storage alloys, derived from the V-Ti-Zr-Ni and V-Ti-Zr-Ni-Cr alloys of Sapru et al and Venkatesan et al, in which the V, Ti, Zr, Ni, and Cr are partially replaced, either individually or as a group, by one or more elemental modifiers, and the alloy has the nominal composition:

$$(V_{4-y}Ni_yTi_{2-x}Zr_xCr_z)_aM'_bM''_cM_d^{iii}M_e^{iv}$$

where x is between 0 and 1.5, y is between 0.6 and 3.5, z is between 0.00 and 1.44, a designates that the V-Ni-Ti-Zr-Cr component as a group is from 70 to 100 atomic percent of the alloy, and b, c, d, e, . . . , are modifiers which may be individually or collectively up to 30 atomic percent of the total alloy, and M', M'', $M^{iii}$, and $M^{iv}$ are chosen from Al, Mn, Mo, Cu, W, Fe, Co, Si, Sn, Zn, and combinations thereof, as will be more fully described hereinbelow. It is, of course, to be understood, that the stoichiometric coefficients in the above nominal formula actually encompass a range of homogeneity, with the coefficient on the V, 4−y, actually being within the range of 3.6−y to 4.4−y, as long as vanadium and nickel are both present in the composition, and with the coefficient on the Ti, 2−x, actually being within the range of 1.8−x to 2.2−x, as long as titanium and zirconium are both present in the composition. Thus, the nominal composition may be represented by the formula:

$$(V_{y'-y}Ni_yTi_{x'-x}Zr_xCr_z)_aM'_bM''_cM_d^{iii}M_e^{iv}$$

where x, y, z, a, b, c, d, e, M', M'', $M^{iii}$, and $M^{iv}$ are as defined above, x' is between 1.8 and 2.2, and y' is between 3.6 and 4.4.

For simplicity sake, and for practical application, the modifiers are demonstrated with the composition $V_{22}Ti_{16}Zr_{16}Ni_{39}Cr_7$, which was specifically disclosed and claimed in U.S. Pat. No. 4,728,586 to Ventakesan et al., of record. This particular composition has shown excellent overall electrochemical properties. While the modifiers have been demonstrated to function on this composition as $((V_{22}Ti_{16}Zr_{16}Ni_{39}Cr_7)_{95}M_s)_{95}M_5$, where M is one or more of Al, Co, Mn, Fe, W, Cu, Mo, Si, Sn, Zn and combinations thereof, it should also be understood that the modifier accentuates performance outside of this stoichiometry is demonstrated by $V_{21}Ti_{16}Zr_{15}Ni_{31}Cr_6Co_6Fe_6$ where Co+Fe were preferentially substituted in the alloy to emphasize cycle life.

Further, while modifiers have been shown at a level of 5 to 13 atomic percent, it is to be noted that the modifier may be used at an effective level below five atomic percent, and as a group modifiers may be used up to thirty atomic percent, or even higher, of the alloy. It will be shown hereinbelow that the functionality of a modifier can be predicted, and the concentration of a particular modifier will result in the enhancement of a specific parameter.

Consequently it should be understood that while modifiers are more simply written as:

$$(V_{22}Ti_{16}Zr_{16}Ni_{39}Cr_7)_aM'_bM''_cM_d^{iii}M_e^{iv}.$$

the invention herein contemplated and described includes compositions having the more general formula $$(V_{y'-y}Ni_yTi_{x'-x}Zr_xCr_z)_aM'_bM''_cM_d^{iii} \ldots$$

It is, of course, to be understood that where specific compositions are given, other compositions with like properties and within the homogeneity range thereof are encompassed thereby.

In a preferred exemplification the principle modifier is a combination of Fe and Co. In a still further and particularly preferred exemplification, the alloy comprises the primary modifiers, Fe and Co, which either partially substitute for Ni only, or partially substitute for V-Ti-Zr-Ni-Cr, and either alone or in combination with other modifiers such as Al and/or Mn. One particularly preferred family of hydrogen storage alloys are the V-Ti-Ni-Cr-Co-Fe class of alloys, exemplified by $V_{21}Ti_{15}Zr_{15}Ni_{31}Cr_6Co_6Fe_6$. The above described modifications and substitutions result in other particularly preferred alloys and families of alloys, such as V-Ti-Zr-Ni-Cr-Co, V-Ti-Zr-Ni-Co, V-Ti-Zr-Ni-Fe, V-Ti-Zr-Ni-Co-Fe, and V-Ti-Zr-Ni-Cr-Fe, as well as V-Ti-Zr-Ni-Cr-Co-Mn-Al, and V-Ti-Zr-Ni-Cr-Co-Mn-Al-Fe. Moreover, it is to be understood that in the system V-Ti-Zr-Ni-Cr-Co-Fe the Fe and Co may substitute for either V-Ti-Zr-Ni-Cr, or Ni, or both V-Ti-Zr-Ni-Cr and Ni.

As is well known in the rechargeable battery art, the introduction of a new system, e.g., rechargeable batteries utilizing metal hydride negative electrodes, is promoted as the electrochemical properties thereof are enhanced. Thus, there is motivation to improve properties, such as, specific capacity, midpoint voltage, polarization, low temperature voltage and capacity, and, particularly, cycle life.

There are many methods and design expedients commonly used in electrochemistry to enhance performance. These methods are relevant to most systems. For example, cell capacity is increased by better utilization of active material, special cell designs to incorporate more active material, and even sacrifice of other properties. Midpoint discharge voltage may be improved by better current collection, higher electrode surface area, special surface treatments, and optimized porosity and pore size. Some of the same methods described with respect to improving mid-point discharge voltage may also be used to improve low temperature behavior. The improvement of low temperature properties may also include modification of the electrolyte. Cycle life is a particularly important characteristic, and frequently cycle life problems are materials related. Specific improvements are generally specific for and directed to a particular system.

The invention described and claimed herein deals with improved electrochemical performance through basic improvement of the hydrogen storage alloys. The modified alloys described and claimed herein have one or more of the following features or attributes:

1. An increase in the active surface area.
2. An increased surface catalytic activity to provide one or more of:
   a. decreased metal oxidation,
   b. enhanced $O_2$ recombination.
3. A surface oxide or film which is:
   a. of controlled thickness, i.e., thicker or thinner,
   b. of controlled conductivity, i.e., higher or lower conductivity.
4. Decreased corrosion of one or more elements of the alloy.
5. An oxide which allows, catalyzes, or enhances activation.
6. An oxide which precipitates species that:
   a. inhibit corrosion of other species;
   b. decrease oxygen evolution at the positive electrode by increasing the $O_2$ overvoltage thereof;
   c. protect the Ni hydroxide electrode from other corrosion species or mechanisms which can promote oxygen evolution, and/or decrease charge efficiency, and/or lower cell capacity.
7. An increased hydrogen storage capacity and/or hydrogen utilization.
8. A modified intergranular phase composition, structure, or proportions.
9. Improved bulk diffusion in the metal hydride, by, for example, modification of phase composition, structure, or proportion.
10. Reduced heat of formation of the M—H bond, thereby increasing the discharge voltage of the cell.
11. Improvement in one or more of bulk diffusion or catalysis in the metal hydride through modification of one or more grain compositions, microstructure, or grain boundaries within the multiphase material.

Some of the modifiers, such as Al, Mn, Cu, W, Fe, Co, and combinations of one or more of Co, Fe, Mn, and Al, improve electrochemical specific capacity. For the $V_{22}Ti_{16}Zr_{16}Ni_{39}Cr_7$ alloy, the typical capacity is about 320 milliampere hours per gram (mAh/g) of active material. The above mentioned modifiers raise the specific capacity to as high as 349 mAh/g. This is shown in detail in Example 1.

Though not wishing to be bound by this or any specific theory, it is believed that higher specific capacity is obtained through improved catalysis. None of the modifiers is a hydride former under electrochemically useful conditions. In fact, by dilution, the hydride forming elements, V, Ti, and Zr, are actually reduced in concentration in the alloy. It is therefore believed that instead of actually storing more hydrogen, the modifiers increase the utilization of available hydrogen. This may be due to improved hydrogen bulk diffusion through the alloy or through grain boundaries, higher surface area, elimination of deleterious phases or surface conditions allowing more complete charge, and/or discharge. Even though testing is done at low charge and discharge rates, the improvement in specific capacity may be related to improved rate capability. The modifier's function may be weakening the M—H bond within particular phases, providing less distinct grain boundaries, metallurgically providing higher surface area, and/or electrochemically providing a surface with more porosity, higher conductivity, and/or more catalytic activity. Moreover, by raising the discharge voltage, the capacity may be enhanced since capacity is measured to a specific cutoff voltage.

Some of the modifiers improve discharge rate capability, improving one or more of: higher midpoint voltage on discharge, decreased polarization during flooded half-cell testing, or lower internal resistance when testing in a sealed cell. Appropriate modifiers for this purpose are Al, Mn, Mo, Cu, W, Fe, Co, the combination of Co-Mn-Al, and particularly the combination of Fe and Co. Magnitudes of improvement range from a 50 mV to 100 mV increase in midpoint voltage at a 2 amp discharge rate for a C size cell, a 40 percent decrease in half cell polarization, and a 28 percent reduction in sealed cell internal resistance. It should be noted that internal resistance denotes voltage drop with changing current, V/I, and not impedance, which is more a measure of current collection.

Though not wishing to be bound by this theory, there are several explanations for the improvement in discharge rate capability. As discussed previously, there are commonly known methods, techniques and expedients to improve rate capability beyond alloy modification. These may involve the attainment of very small particle size by grinding, i.e., to provide increased surface area, electrode pretreatment, i.e., to provide the electrode surface oxide with enhanced porosity, and electrode and powder coatings to provide a conductive, oxidation resistant coating.

Improvements in discharge rate through alloy modification avoids these elablorate, costly, and time consuming methods, and provides significant and practically achieved improvement. First, discharge voltage may be increased through changes to the metal-hydrogen bond or metal hydride heat of formation. The modifier elements (Al, Mn, Mo, Cu, W, Fe, Co, and combinations thereof) are not to be considered as "mixed in," but present in the particular alloy phases. For example in the composition $V_{22}Ti_{16}Zr_{16}Ni_{35}Cr_7$, there is a phase which is identified as predominantly V-Cr. This phase is undesirable since large amounts of the hydrogen storing element, vanadium, are "bound up" with low concentrations of catalyst and therefore are essentially unavailable for storing hydrogen. Additionally, the hydrogen present in this phase, since it is basically inactive, is more prone to damage by oxidation and corrosion. The instant inventions have found that by adding modifiers such as Fe, Co, and Fe-Co combinations to the basic Ti-V-Zr-Ni-Cr material it is possible to substantially eliminate the V-Cr, and according to thermodynamic principles, voltage is higher.

A second route for improved discharge rate capability relates to bulk diffusion of hydrogen within the alloy. In one model for how these multiphase materials work, the argument is made for "storage" and "catalyst" phases. Essentially, the model considers that certain alloy phases store large quantities of hydrogen, but as individual phases may have very low discharge rate capability. Rather, in the multiphase alloy, this phase is in intimate contact with other phases, which also store hydrogen, but have much higher rate capability. One aspect of the invention described herein is the modification of intra-phase grain boundaries. As viewed from a scanning electron microscope, the grain boundaries of the modified hydrogen storage materials of the invention are "less distinct", i.e., more diffuse then the grain boundaries of the V-Ti-Zr-Ni-Cr alloy described in Venkatesan et al. It is believed that these grain boundaries may provide rapid diffusion of hydrogen from storage phases to catalyst phases, where the hydrogen reacts with hydroxyl ions for discharge.

A third route to improved discharge rate capability relates to active surface area. It is possible through alloy modifications to substantially increase or decrease the amount of "cracking" of the metal. During charge/discharge cycling the metal hydride material expands and contracts as hydrogen is stored and released. This can provide a volumetric expansion of the hydrogen storage alloy of up to 20 percent. Metallurgically, some metallic alloys can not handle the stress of this massive expansion, and form cracks. For some applications, this is a problem as the structural integrity of the electrode may be inadequate. However, with proper cell design, structural integrity can be compensated, while preserving the high surface area that is advantageous for high rate discharge. High surface area resulting from alloy modification is a vast improvement over high surface area attained by other methods, such as very fine powder grinding, as it avoids the elaborate processing steps associated therewith and provides "in situ created surface area," i.e., surface area formed inside the cell. This type of surface area, which is associated with the modifiers described and claimed herein is desirable as it avoids oxidation due to atmospheric exposure during fabrication, which can lead to difficult activation (high pressure, low capacity, low rate capability, and expensive electrical formation procedures) and corrosion products in the cell. The modifiers may be acting as embrittlement agents by decreasing the metallurgical ductility of the host alloy. As part of the invention, it has been noted that some modified alloys are harder than the host $V_{22}Ti_{16}Zr_{16}Ni_{39}Cr_7$, supporting the proposition that ductility is probably decreased, since usually hardness and ductility are inversely proportional.

A fourth possible route to improved high rate discharge through alloy modifications relates to surface oxidation properties. As previously noted hereinabove, reserarchers have attempted to provide coatings to powder or electrodes in order to prevent or minimize oxidation in the highly alkaline electrolyte. It should be noted that the metal hydroxide/electrolyte interface is the reaction site during cell charge and discharge. Thus, the surface oxide must allow hydrogen to react with hydroxyl ions. Consequently, the oxide thickness, porosity, conductivity, and presence of catalyst are all important. The modifier elements may assist one or more of these features, although in this case individual modifier elements do not all function identically. Aluminum, for example, would be expected to oxidize and "leach out" from the surface, probably assisting in providing porosity to the oxide, perhaps viewed as roughness quality. Similarly, Fe would normally be expected to oxidize, and "poison" the metal-hydride system. On the other hand, Mn, Mo, Cu, W, and Co might be reducing oxide thickness, and providing a more conductive and/or catalytic component to the surface, and, while their oxides can in some cases corrode, probably function less in providing surface porosity then does aluminum.

Improved discharge rate through alloy modification may also involve lowering activation polarization of the metal hydride electrode. It is believed that the presence of Mn, Mo, Cu, W, Fe, Co, Co-Fe combinations, and Co-Mn-Al combinations at the metal-electrolyte interface lower the voltage drop across the electrochemical double layer. This may occur by lowering the energy barrier of the charge-transfer step, essentially lowering the overvoltage of the charge transfer step. By catalysing the hydrogen/hydroxyl reaction, the activation of adsorbed surface species is easier. For example, oxides of Co may be promoting the reduction of species like hydroxyl ion.

Another important route to improved discharge rate capability relates to improved metal hydride electrode activation, especially in a sealed cell. Improved degree of activation raises the distinction between an "as fabricated" metal hydride electrode and an "activated" metal hydride electrode, especially as related to surface area and surface oxide. For example, the surface area of an "activated" metal hydride electrode might increase by two or even three orders of magnitude during cycling as compared to an "as fabricated" metal hydride electrode, while "as fabricated" surface oxides may be inappropriate for charging acceptance or discharge. Surface area increase in a sealed cell is especially difficult, primarily because sealed cells use excess metal hydride capacity for overcharge/discharge reactions, essentially underutilizing the metal hydride electrode, i.e., lowering the metal hydride depth of discharge.

Improved activation using modified alloys may relate to easily overcoming initial surface oxides (as in the case of Al), but also by quick and easy "desired surface area attainment" during initial cycling, especially in the sealed cell for a metal hydride electrode with a low depth of discharge. It is believed that Al, Mn, Mo, Cu, W, Fe, Co, Co-Fe combinations, and combinations of Co, Mn, and Al all may function in this manner.

Another function of alloy modification is enhancement of low temperature capability, either by increasing capacity or by increasing discharge voltage. Inherent low temperature limitations in electrochemical applications are commonly known. The most common explanation for poor low temperature performance relates to the reaction:

$$MH + OH^- = M + H_2O + e^-$$

where water is formed at the metal hydride surface, causing polarization and lowered capacity. This explanation is certainly valid to some degree, and is perhaps dominant based on polarization studies showing heavy concentration dependence. Other contributing factors may relate to thermodynamic and activation polarization components. Thermodynamic contributions can be understood by referring to the "PCT Behavior" or equilibrium hydrogen pressure measurements as a function of hydrogen content at a given temperature. In these measurements, lowering the test temperature from $+25°$ to $-20°$ Celsius substantially lowers the equilibrium hydrogen pressure. This will be seen as a voltage drop in the cell of perhaps 100 mV, or more. Activation polarization at low temperatures is perhaps not a large contributing factor, but nevertheless the catalytic properties of the metal hydride surface may have some temperature dependence.

It is well known in electrochemistry that concentration polarization problems indicate mass transfer limitations of the reactants or products. Traditionally, methods of correction involve increasing the concentration of a critical species, or increasing pathways at an electrode. Stated simply, this means increasing porosity, pore size, and/or surface area. All of these methods will have a beneficial effect to some degree, but frequently are impractical for overall performance characteristics such as energy density, cycle life, etc. The method of alloy modification does not have these limitations and shortcomings. In fact, the dramatic improvement for some alloys, as described in the Examples, was accomplished with standard concentrations and compositions of electrolyte, and with standard electrode porosity and initial powder size. These facts give support to the idea that the factors described above are critical and can be influenced.

Alloy modification improvements are believed to address all three factors, namely concentration polarization, activation polarization, and thermodynamic properties. Essentially, concentration problems involve the amount of water generated, which is completely dependent on the discharge rate. However, the "water thickness" can be drastically affected by the amount of surface area provided over what area the water is generated. Of course, it is also important that pore size and porosity be sufficient to allow fast diffusion. Like high rate discharge, surface area increase due to metallurgical modification of the alloy by Al, Mn, W, Fe, Co, and particularly by Fe-Co combinations and Co, Mn, Al combinations, would be expected to assist low temperature performance. This, in fact, is correct, but the effects do not correlate completely. This supports the contention that other factors related to alloy modification, such as thermodynamic or activation polarization phenomena, contribute to the overall effect.

Cycle life is a particularly important parameter for a nickel hydride secondary battery. Cycle life is defined as the number of charge/discharge cycles that a battery can be subjected to under a given set of conditions to a defined cutoff point. The cutoff point is usually a desired capacity expressed as a stated percentage of original capacity.

Many parameters relating to the metal hydride electrode can influence overall cycle life in a sealed cell with an N-hydroxide positive electrode. For example, it is important that the negative electrode maintain mechanical integrity upon repeated charge/discharge cycling. This is important because, as noted above, alloy modification frequently provides higher surface area through a "cracking" phenomena, and the "cracking" might be expected to compromise structural integrity.

Another important parameter is generally referred to as "oxidation". Generally, oxidation can adversely affect cycle life in many ways. Build-up of oxide at the metal hydride electrode can reduce charging efficiency; raising internal pressure levels possibly to the degree of vent release, resulting in a loss of electrolyte, and thereby in an impaired state of electrode charge. Oxidation also causes lowered electrode capacity by effectively insulating portions of powder in the electrode, thus rendering that powder electrochemically inactive. Oxidation can also affect charge balance in the cell. Formation of metal oxides from water or hydroxyl ion can decrease electrolyte amount, liberate hydrogen gas, or decrease electrolyte concentration. Buildup of surface oxide substantially increases the polarization of the metal hydride electrode, causing an undesirable decrease in voltage on discharge, and an increase in charging voltage. Some of the metal oxides which form upon reaction with the electrolyte or during oxygen recombination are soluble or can form precipitates. This is undesirable. Vanadium, for example, has been proven to be easily soluble, and able to form redox shuttle mechanisms, thereby increasing self discharge.

The prior art is silent as to other oxidation related problems as well, for example, oxidation problems related to the detrimental effects on the positive electrode and on overall cell operation. Oxides of titanium and zirconium have also been observed to impair cell operation. With very low solubility, it would be expected that $TiO_2$ and $ZrO_2$ or derivatives thereof would simply buildup at the metal hydride surface. Though undesirable for the reasons states above, the less obvious fact has been the observance of $TiO_2$ and $ZrO_2$ at the nickel hydroxide positive electrode and the separator.

Though not wishing to be bound by this theory, it is believed that these oxides have been precipitated, possibly causing two problems. The first problem is that the oxides have a high surface area. It is believed that these high surface area oxides at the negative and positive electrodes and at the separator retain electrolyte by capillary action. For a sealed cell, this is undesirable since, by definition, there is a finite electrolyte supply, and, ultimately, electrolyte redistribution is a dominant failure mode. Normally, electrolyte redistribution occurs through inevitable expansion of both electrodes. By having a side reaction which can steal electrolyte, the problem is accelerated. The second is that the nickel hydroxide positive electrode dramatically loses charging efficiency upon extended charge/discharge cycling. It is believed that $TiO_2$ and $ZrO_2$ precipitates, which are not only at the outer electrode surface, but have been found deep in the nickel hydroxide electrode interior, are promoting premature oxygen evolution. This effectively reduces cell capacity. It is believed that $TiO_2$ and $ZrO_2$ catalyze the oxygen evolution ostensibly by lowering the oxygen overvoltage on charge.

Alloy modification of the $V_{22}Ti_{16}Zr_{16}Ni_{39}Cr_7$ type alloy has substantially improved cell life of sealed cells incorporating the modified alloys as compared to sealed cells with unmodified $V_{22}Ti_{16}Zr_{16}Ni_{39}Cr_7$ type alloy negative electrodes. While even the standard V-Ti-Zr-Ni-Cr material has demonstrated acceptable cycle life, by alloy modification the cycle life has been extended, while maintaining good charging efficiency. This has been verified under aggressive test conditions of 100% depth of discharge.

Before discussing the very important improvements of alloy modification related to oxidation, it should be noted that mechanical stability of the metal hydride electrode has also been improved. This result is surprising since alloy modification has improved activation, high rate discharge, and low temperature performance, at least in part due to higher attained surface area. Yet inspection of highly cycled cells and half cell negative electrodes with modified alloy has shown improved mechanical integrity. In flooded half-cell testing, which emphasizes mechanical integrity over oxidation resistance due to the high depth of discharge, lack of physical restraint, and no oxygen recombination, it is common to observe material "falling off of the substrate" during cycling. In this regard the alloy $V_{20.6}Ti_{15}Zr_{1.5}Ni_{30}Cr_{6.6}Co_{6.6}Mn_{3.6}Al_{2.7}$ has shown better particle to particle bonding and better adherence to the substrate than the standard $V_{22}Ti_{16}Zr_{16}Ni_{39}Cr_7$ type material of the prior art. In sealed cell testing the cobalt modified alloy, $V_{22}Ti_{16}Zr_{16}Ni_{32}Cr_7Co_7$, has been inspected after 500 cycles and found to have remarkable integrity, i.e., substantially better then the prior art $V_{22}Ti_{16}Zr_{16}Ni_{39}Cr_7$. Other alloy compositions having good cycle life, for example, those alloys modified by Mn, Cu, Fe, Co, Fe-Co combinations, and other Co-Mn-Al combinations, may also be functioning through improved structural integrity.

Though not wishing to be bound by their theory, it is believed that the alloy modifiers may be quickly achieving a steady state high surface area. That is, the alloys may be brittle enough that during initial cycling large amounts of new surfaces are formed but the new surface area quickly reaches a limiting value upon extended cycling. From metallurgical considerations, it is possible this relates to a more optimized stress-strain relationship, or toughness providing the electrochemically desirable properties of:

High surface area formed in situ.
Fast activation (surfaces formed quickly)
Reduced formation of new surfaces area during extended cycling thereafter.

Many of the modifiers exhibit particularly improved charging efficiency compared to unmodified alloys. More specifically, Mn and Cu show improved charging efficiency, Fe, and Co-Mn-Al combinations, and most particularly Co, and Fe-Co combinations show even greater improvements in charging efficiency. This is shown and described in the Examples hereinbelow.

Though not wishing to be bound by their theory, the modifications appear to be improving cycle life by improved oxidation resistance. For example, while cobalt does oxidize and is soluble, the cobalt oxide may be inhibiting further oxidation of the other elements. Another aspect of the invention is improved oxygen recombination. Previously, it was observed that oxygen gas generated at the nickel hydroxide positive electrode recombined at the surface of the metal hydride electrode. Oxygen recombination is an especially aggressive oxidizer of its environment, even compared to the alkaline electrolyte. It is possible that the modifier elements, Fe, Co-Mn-Al, and particularly Co and Fe-Co combinations, act to catalyze the oxygen reduction, thereby avoiding or reducing the oxidation of the surrounding elements in the metal hydride alloy. It is believed that this function of the modified alloy reduces or even eliminates the formation and build-up of detrimental surface oxide, thereby providing a thinner and more stable surface.

Another aspect of the improved oxidation resistance by alloy modification again relates to improved corrosion resistance. It was previously discussed hereinabove that $TiO_2$ and $ZrO_2$ can affect nickel hydroxide oxygen evolution and that oxides of vanadium are quite soluble, providing excessive self discharge. The modified alloys eliminate these problems in at least two ways. Again, while not wishing to be bound by this theory, it is believed that levels of $TiO_2$, $ZrO_2$, and $V_2O_5$ are significantly reduced by simply inhibiting their formation at the metal hydride surface, thereby preventing corrosion and migration of the species. Second, and quite surprisingly, we have observed that modifiers are precipitated at the Ni hydroxide positive electrode. The surprising aspect of finding modifiers precipitated at the Ni electrode is the fact that the modifiers function by inhibiting oxidation and corrosion. Yet, the oxidation/corrosion inhibiting species, i.e., cobalt, is found precipitated at the nickel electrode as cobalt oxide.

This finding suggests still other aspects of the oxidation-corrosion benefits of the modified alloys of the invention disclosed herein. First, it is possible that the modifier dissolves from the negative electrode in one oxidation state and precipitates at the positive electrode in another oxidation state. For example, $Co^{+2}$ is readily soluble while $Co^{+3}$ readily precipitates. It is possible the cobalt precipitate inhibits the reduced levels of $TiO_2$, $ZrO_2$, and $V_2O_5$ from reaching the nickel hydroxide surface, thereby avoiding their poisoning effect of promoting premature oxygen evolution. Second, it is possible the detrimental $TiO_2$, and $ZrO_2$ reduction in oxygen overvoltage is compensated or eliminated by the presence of modifier oxides, particularly cobalt oxide. Cobalt is commonly an additive to the nickel hydroxide electrode as cobalt hydroxide, to improve oxygen evolution, activation, and capacity utilization. It is possible that cobalt oxide added to the positive electrode by precipitation from the negative electrode is a different, and particularly successful method of increasing overvoltage, thereby postponing oxygen evolution and providing good charging efficiency, capacity, and cycle life.

The electrode materials of the invention are a complex multiphase polycrystalline structure of the active electrode materials, i.e., more complex than those described in the aforementioned U.S. Pat. No. 4,728,586 of Srini Venkatesan, Benjamin Reichman, and Michael A. Fetcenko for ENHANCED CHARGE RETENTION ELECTROCHEMICAL HYDROGEN STORAGE ALLOYS AND AN ENHANCED CHARGE RETENTION ELECTROCHEMICAL CELL, the disclosure of which was incorporated herein by reference. The materials of Venkatesen et al. include a grain phase which is an intermetallic compound of vanadium, titanium, zirconium, and nickel, with dissolved chromium. The grain phase reversibly stores hydrogen and also has suitable catalytic activity to promote rapid hydrogen oxidation. The composition of this grain phase is about 19:16:19:42:4 as an atomic ratio of vanadium:titanium:zirconium:nickel:chromium.

Between the grain phases of the polycrystalline structure of Venkatesan et al is a primary intergranular phase which is a solid solution of vanadium, chromium, titanium, and nickel. The composition of this intergranular phase is about 65:27:3:5 as an atomic ratio of vanadium:chromium:titanium:nickel. This intergranular phase is believed to be a hydrogen storing phase, with limited catalytic activity for hydrogen oxidation.

Several other phases may be present along with the above mentioned two dominant phases. These phases are dependent on the fabrication conditions of the alloy and electrode. Although not wishing to be bound by theory, it is not believed that the degree of these alternate phases play a critical role in the enhanced properties of the compositionally and microstructurally modified electrodes of the invention.

The phase compositions identified above are for one particular composition, which is disclosed to be a preferred composition of Venkatesan et al. It should be understood that the specific phase compositions for the entire family of $$(Ti_{0.33-x}Zr_xV_{0.67-y}Ni_y)_{1-z}Cr_z$$

where x, y, and z have been previously specified, are variable and dependent on the individual composition. The value of z is such as to allow the Cr to be up to 20 atomic percent of the alloy.

Venkatesan et al discloses that with chromium as a modifier to the V-Ti-Zr-Ni family, the chromium should be present in the primary grain phase on the order of from about 0 to 10 atomic percent, and preferably about 4 atomic percent. Venkatesan et al further discloses that the chromium should be present in the primary intergranular phase on the order of 0 to 35 atomic percent and preferably about 27 atomic percent. Alloys as described by Venkatesan et al are particularly susceptible to further improvements in charge retention by the provision of a highly concentrated electrolyte as described herein.

It is interesting to note that the instant inventors have found that the presence of Cr in the modified alloys taught herein may in fact deleteriously effect electrochemical performance parameter such as cycle life. This is believed to result from the fact that Cr promotes the precipitation of the V-Cr phase during solidifications. Modifications of the alloy with Fe, Co, Co-Mn-Al, and Fe-Co tends to impede the formation of this phase. Decreasing or eliminating Cr in the alloy mix also reduces the formation of the V-Cr phase, allowing a more uniform, homogeneous mixture of materials in the hydrogen storage alloy, resulting in better hydrogen storage properties. Of course, the absence of Cr in the alloy may result in decreased resistance to self discharge. It is important to note, however, that the best overall performing alloy identified by the inventors to date is of the Ti-Ni-V-Zr-Cr family including a synergistic combination of Co and Fe as the modifier.

It has previously been noted that heretofore it was widely believed that the inclusion of Fe in metal-hydride hydrogen storage alloy materials would deleteriously effect electrochemical performance. This belief was due to the knowledge that Fe readily oxidizes and corrodes, particularly in the presence of an alkaline electrolyte. Oxidation, as discussed, reduces the performance of M-H electrode in many ways, and oxides of iron were know in the prior art to adversely affect the nickel hydroxide positive electrode, particularly with respect to charging efficiency and thus capacity and cycle life.

Consequently, it is particularly noteworthy and advantageous that Fe modifications and Fe-Co modification of the base alloy, with and without the presence of Cr, performs so well in cycle life and discharge rate behavior.

Besides technical performance, alloy modification offers tremendous cost and advantages, up to 30%. One of the dominant factors affecting base alloy cost is vanadium. In commonly assigned, copending patent application Ser. No. 383,693, incorporated herein by reference, vanadium in the form of Vi-Ni offers significant cost advantages over pure vanadium in cost. This argument is carried even further if V-Fe can be used.

As will be demonstrated in detail in the Examples hereinbelow, there is a noteworthy and unexpected synergistic effect between cobalt and iron. Generally, the contribution of cobalt is to enhanced cycle life, with minimal effect on rate capability. Iron, on the other hand, while showing improved cycle life over the base alloy, is not as effective as cobalt. Iron, did however, show improved discharge rate capability. Thus, the observations that the Fe-Co combination is better in cycle life than cobalt alone and better in discharge rate cability then Fe above, and allows the significant material cost reduction indicates significant practicality.

Figure 2:
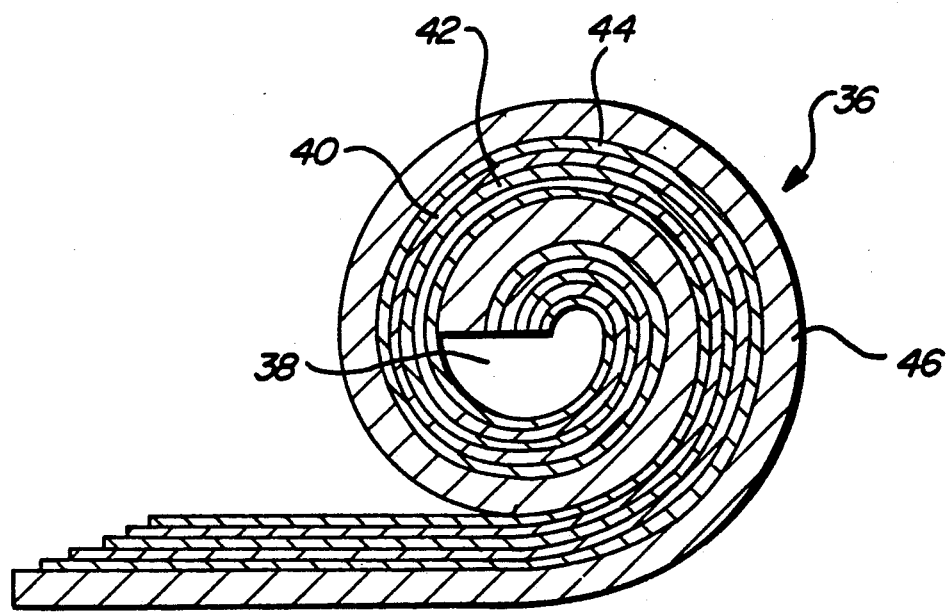
FIG. 2 is a sectional side view of a jelly-roll electrochemical cell.
Figure 3A:
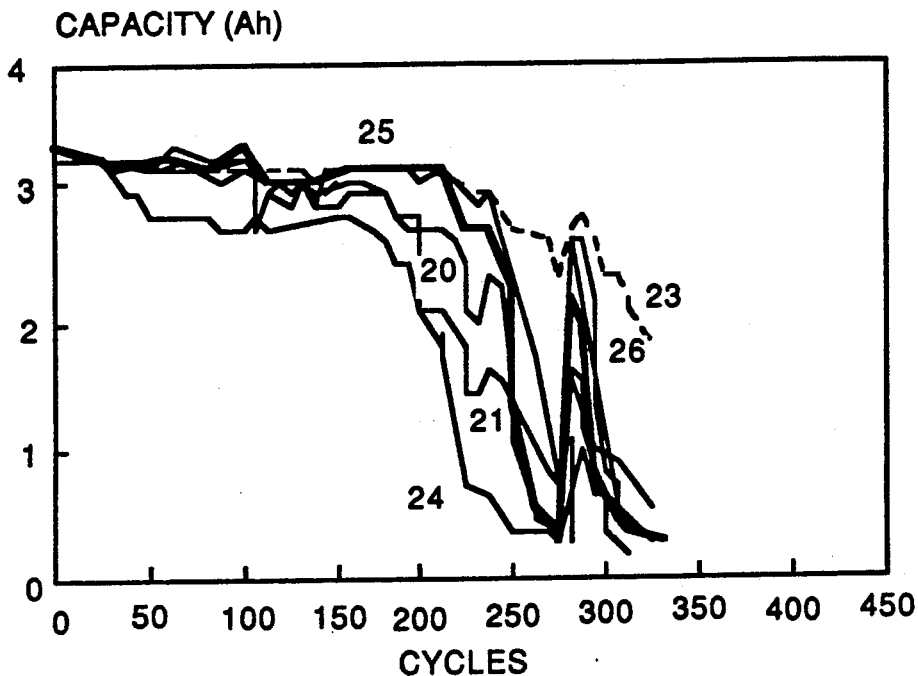
FIGS. 3a–3e are a series of graph which plot of ampere-hours capacity versus cycle number for electrochemical cells having an electrode fabricated of the improved hydrogen storage alloy material, as described in Example IV.
Figure 3B:
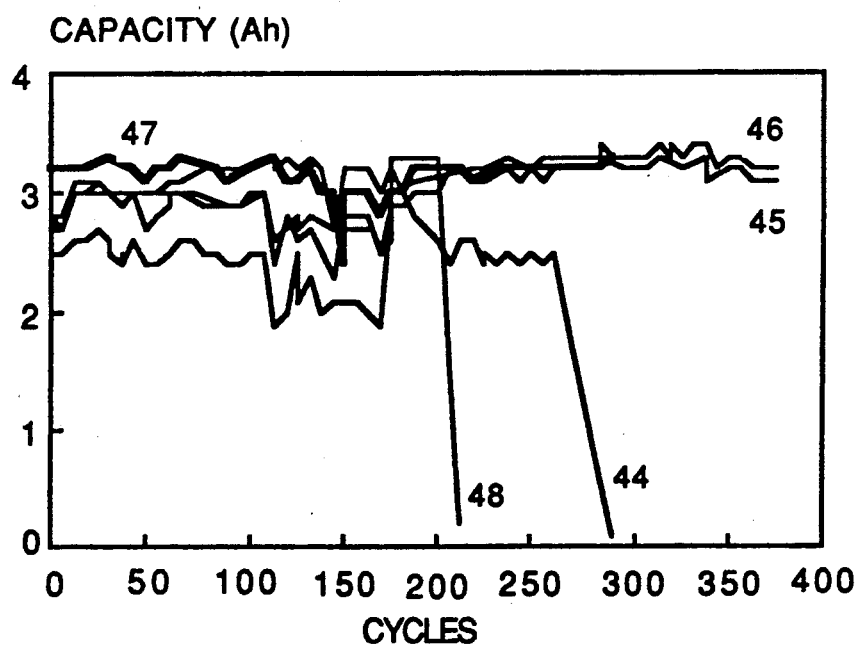
Figure 3C:
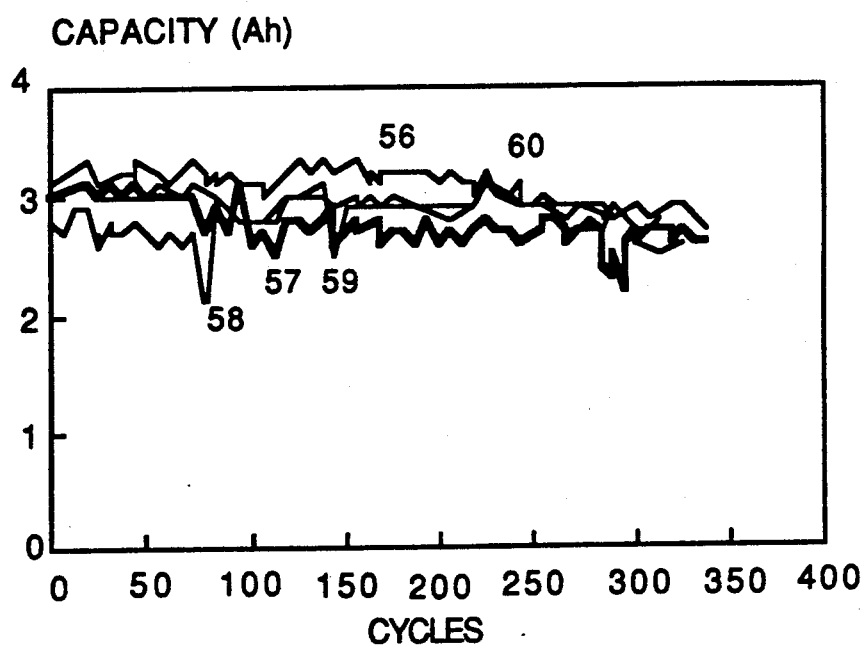
Figure 3D:
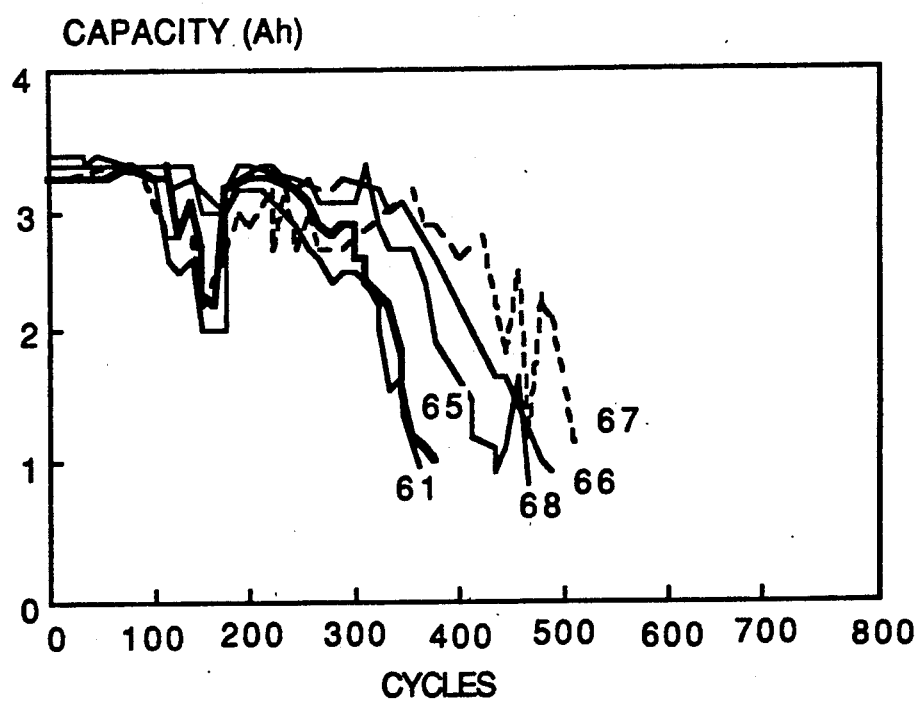
Figure 3E:
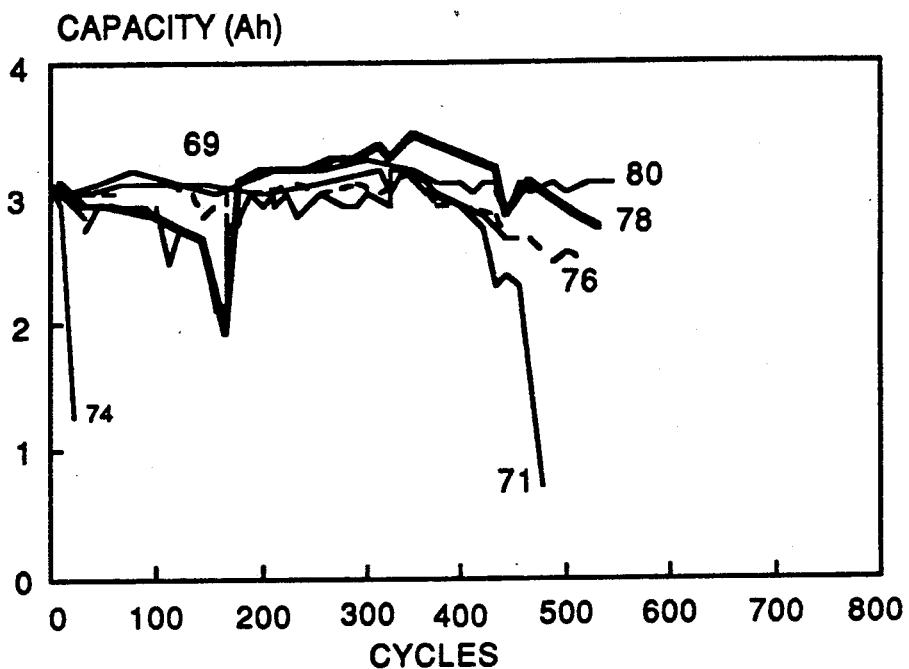
Figure 3F:
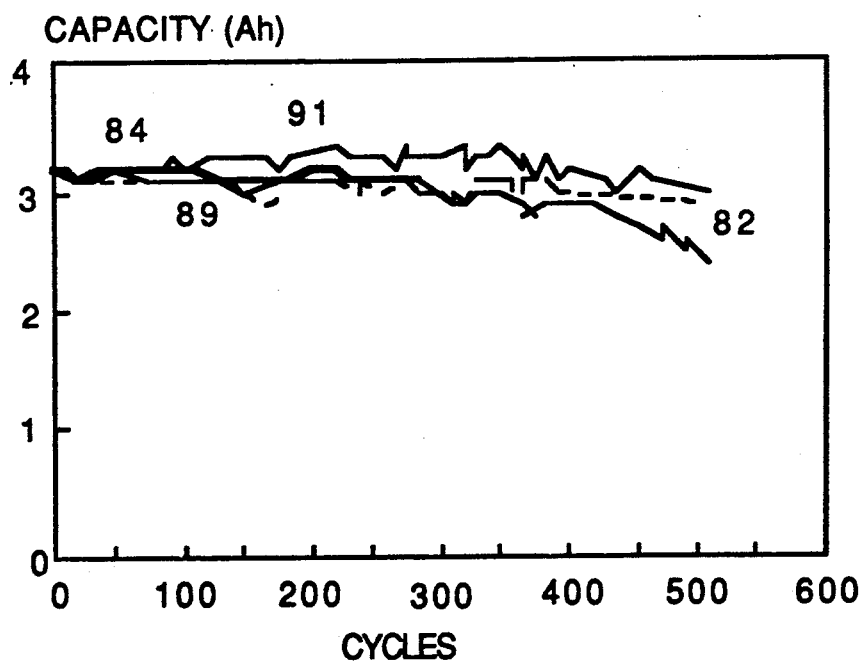
Figure 3G:
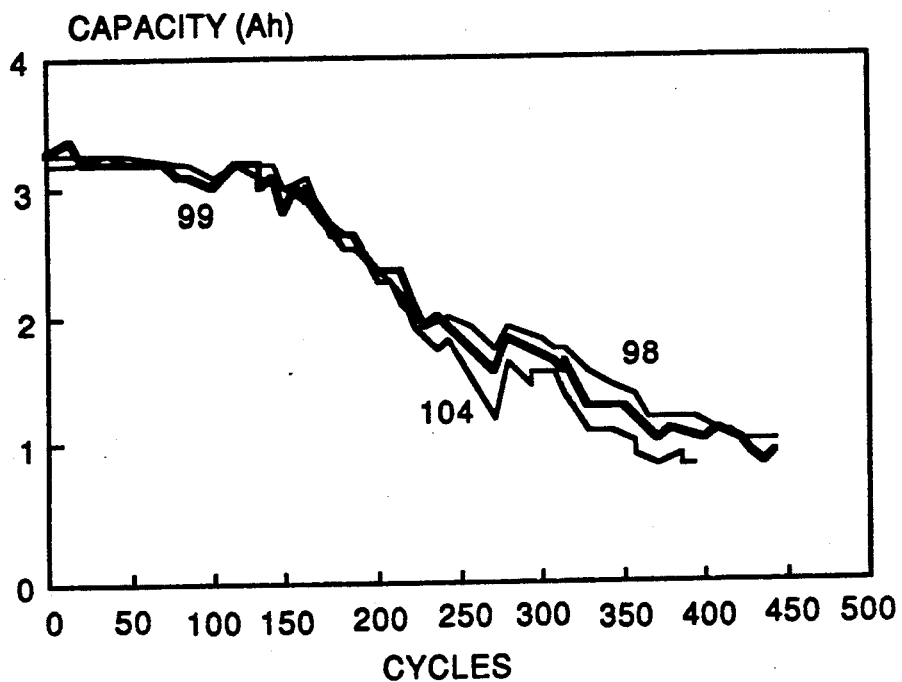
Figure 3H:
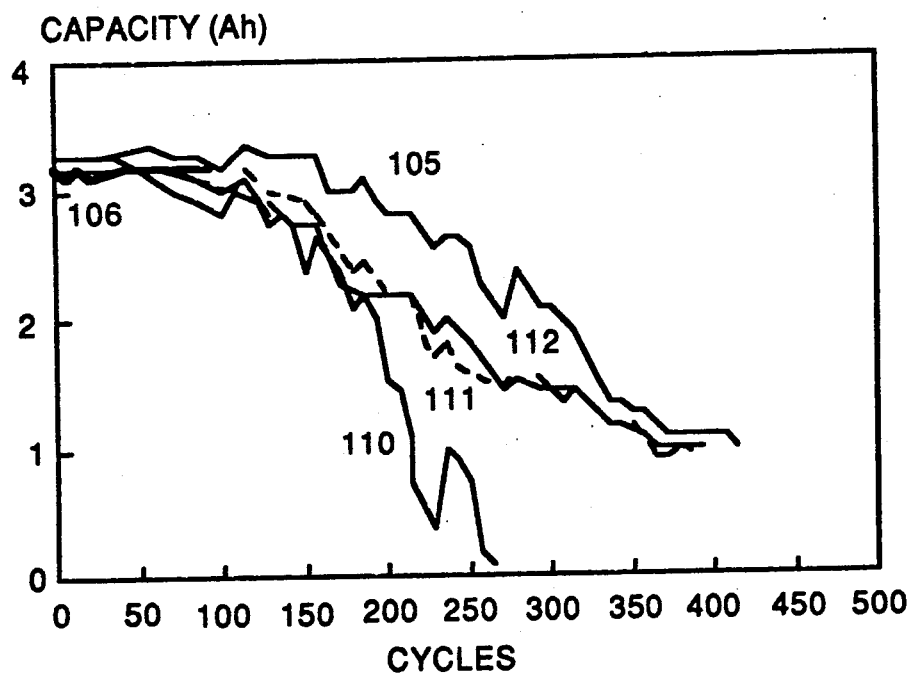
Figure 3I:
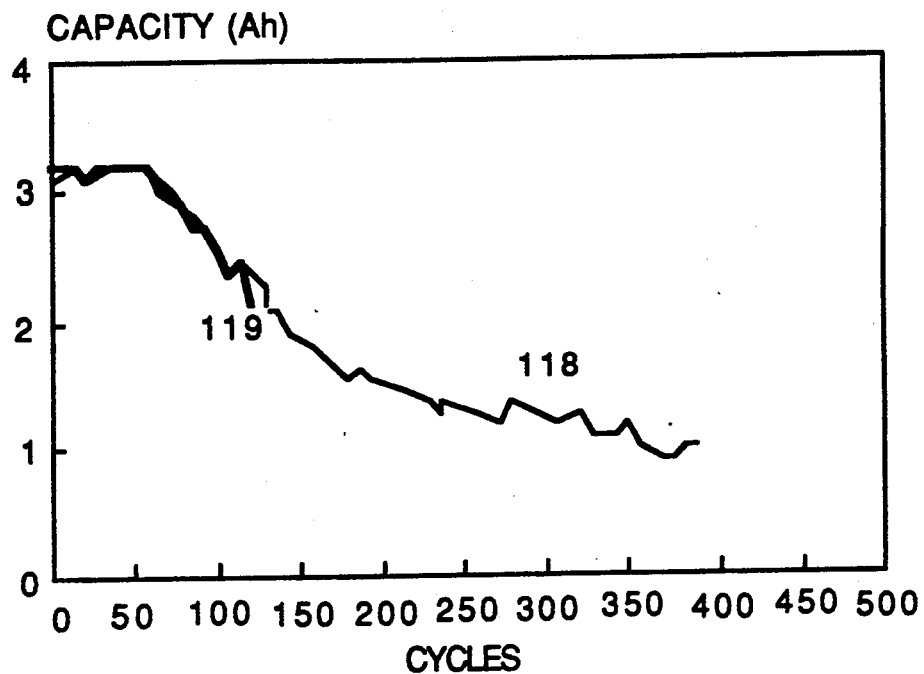
Figure 3J:
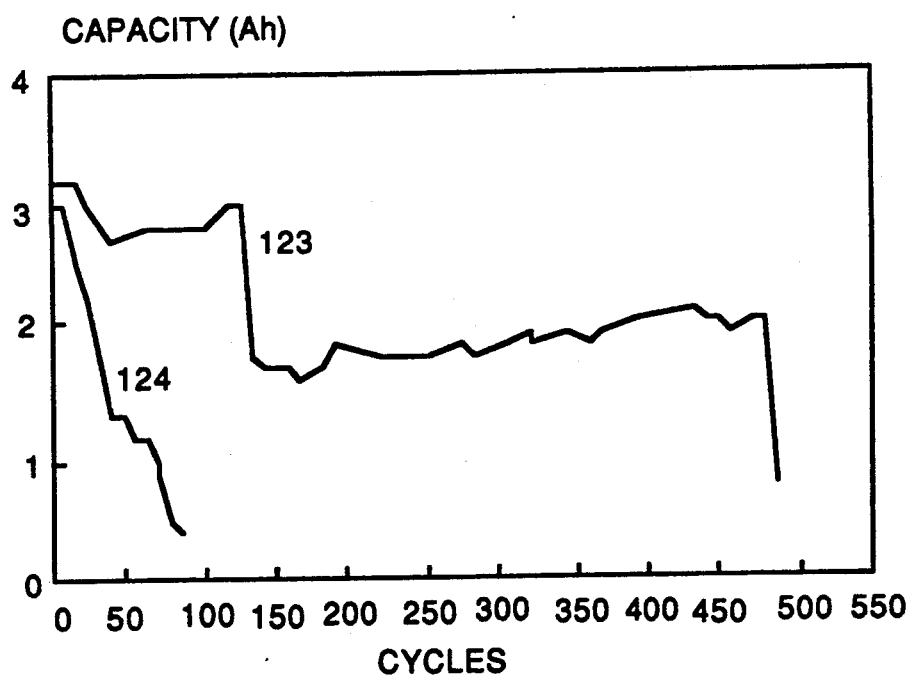
Figure 3K:
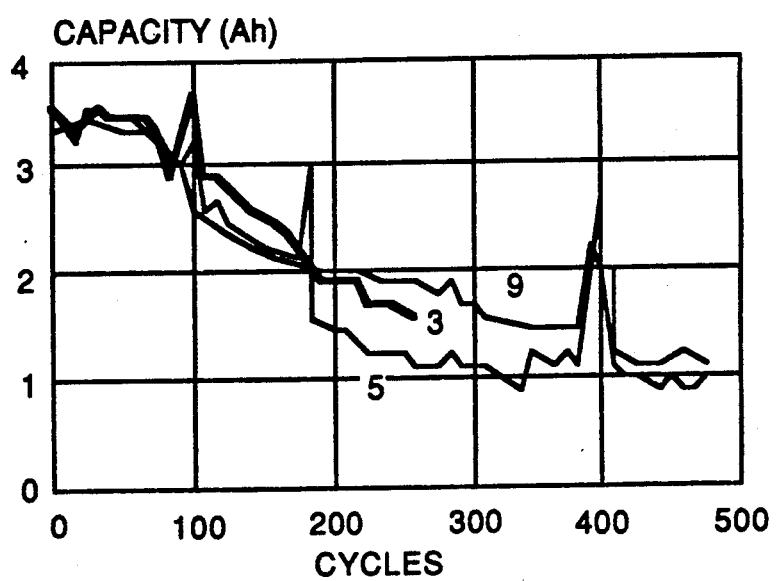
Figure 4A:
FIGS. 4a–4e are a series of scanning electron micrographs illustrating the presence or absence of a V-Cr phase in the improved hydrogen storage alloys of Example I–IV.
Figure 4B:
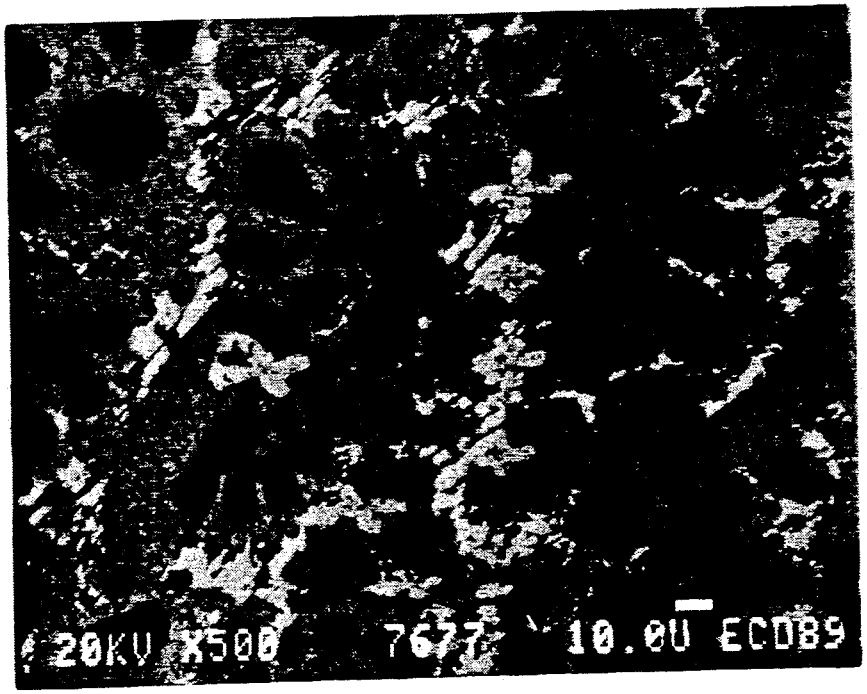
Figure 4C:
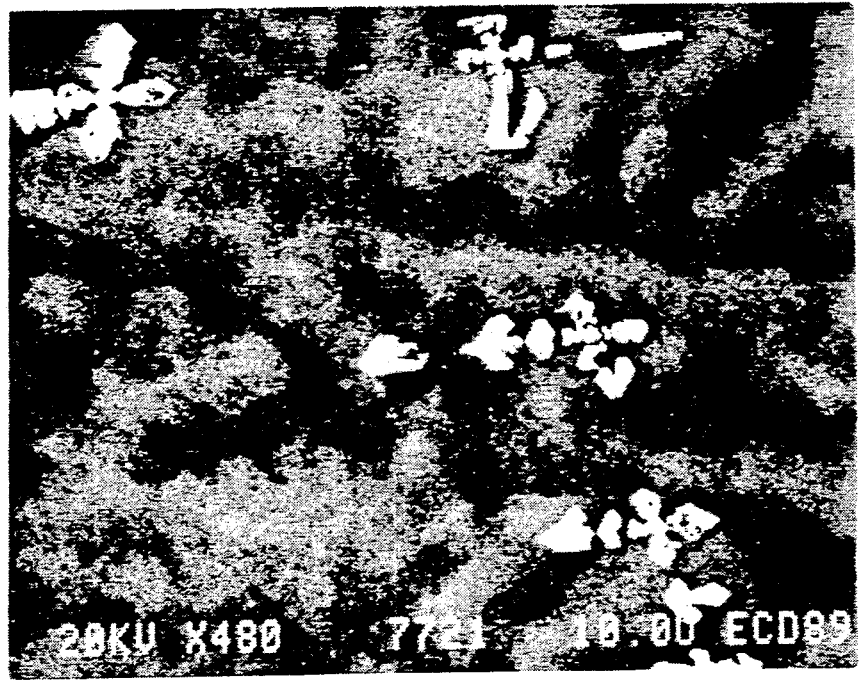
Figure 4D:
Figure 4E:
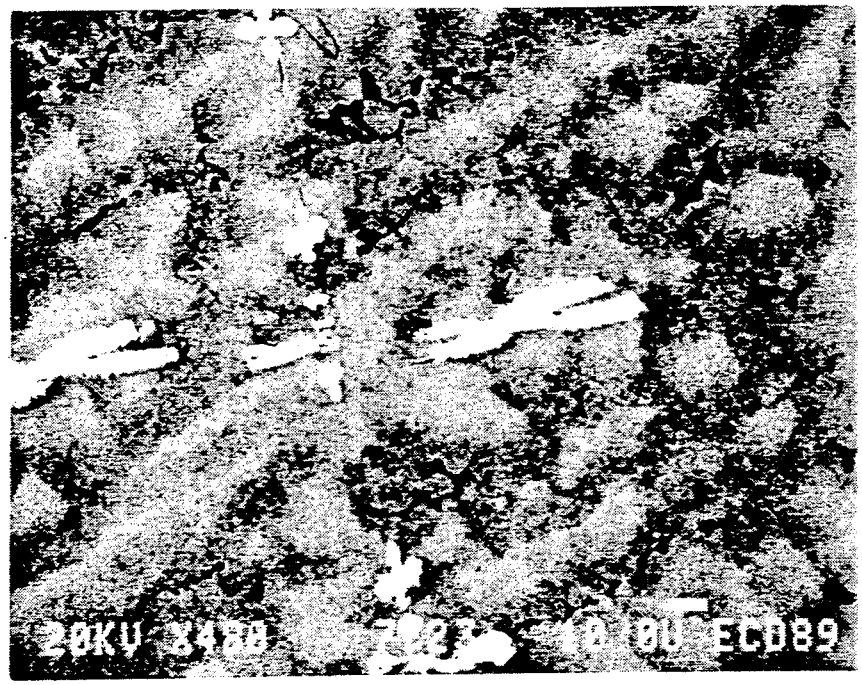
Figure 4F:
Figure 4G:
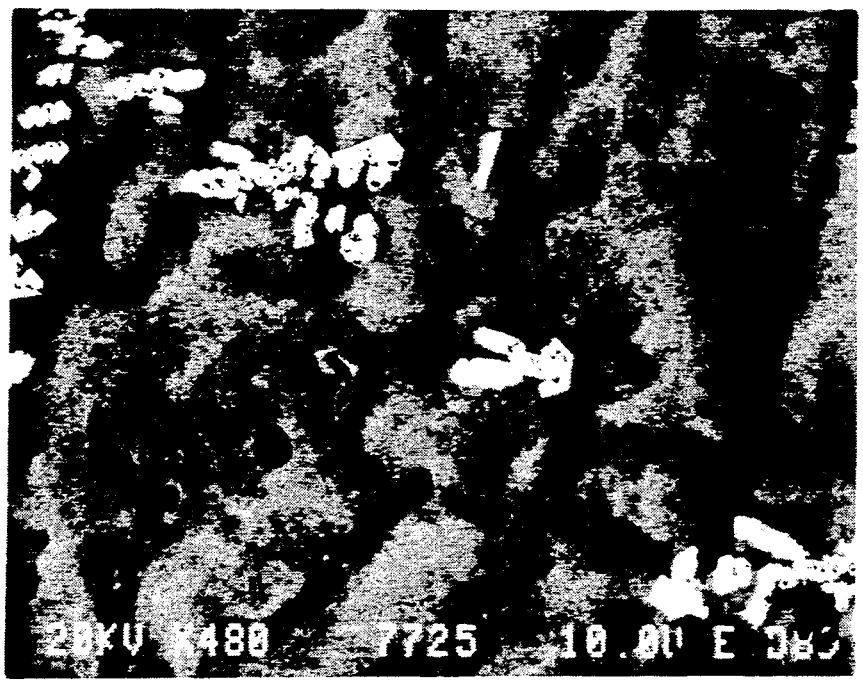
Figure 4H:
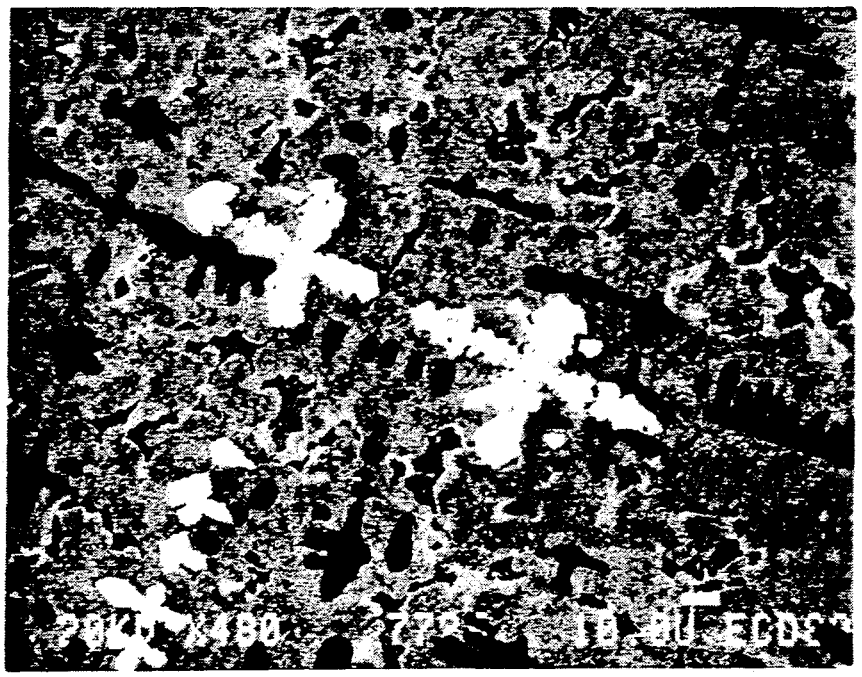
Figure 4I:
Figure 4J:

The active negative electrodes of the invention disclosed herein can be utilized in many types of cells having a metal hydride, hydrogen storage negative electrode and batteries. Referring now to FIGS. 1 and 2, various electrochemical cell embodiments utilizing the negative electrode of the invention are set forth. In FIG. 1, a flat cell 10 is illustrated that includes a substantially flat plate negative electrode 12 in accordance with the invention. Electrode 12 includes a current collector 14 that is in electrical contact with the active material of electrode 12 and a tab 16. Collector 14 and a tab 16 may be made of suitably conductive metals such as nickel. Flat cell 10 includes a positive electrode or counter electrode 18 which is substantially flat and aligned to be in operative contact with negative electrode 12. A separator 20 is disposed between counter electrode 18 and negative electrode 12.

A second negative electrode 22 may be spaced in operative contact with the counter electrode 18 on the side of counter electrode 18 opposite negative electrode 12. Negative electrode 22 is similar to electrode 12 and includes a current collector 24 which is in electrical contact with the active material of electrode 22 and tab 26. A second separator 28 is disposed between negative electrode 22 and the counter electrode 18.

Cell 10 depicted in FIG. 1 may be sealed in a suitable material, such as a plastic container 30, which does not deteriorate in contact with the electrolyte used and allows venting of cell 10 should it gas beyond a predetermined limit during operation. A 30 weight percent aqueous solution of potassium hydroxide is a preferred electrolyte. First and second tabs 16 and 35, 26 are electrically connected to a first set of leads 32 that extends outside of the cell plastic 30. Likewise, a second lead 34 electrically connects to counter electrode 18 and extends outside of plastic container 30.

FIG. 2 illustrates a commercially preferred jelly-roll cell 36 that is made by spirally winding a flat cell about an axis 38. Jelly-roll cell 36 includes an electrical contact tab 40, a negative electrode 42, separator 44 and a positive electrode 46. Jelly-roll cell 36 may be placed in a can or other suitable container (not shown) that contacts tab 40 connected to negative electrode 42. Separator 44 is positioned between the negative electrode 42 and the positive electrode 46.

The following examples are illustrative of the method of the invention.

EXAMPLES

Example I

A series of V-Ti-Zr-Ni-Cr-M'-M''-M$^{iii}$-M$^{iv}$ electrochemical hydrogen storage alloys were cast, and fabricated into negative electrodes for testing in sealed, alkaline cells.

Alloys having the compositions shown in Table I-1 were prepared by weighing and mixing powders of the individual metals into a graphite crucible. The crucible and its contents were placed in a vacuum furnace. The furnace was taken down to a vacuum, and then pressurized with an inert gas. The crucible contents were then melted by high frequency induction melting while under the inert gas atmosphere. The melting was carried out at a temperature of about 1500° C. for a long enough time to obtain a uniform melt. The melt was then solidified to obtain an ingot of hydrogen storage alloy.

The ingot of hydrogen storage alloy was then reduced in size. This was a multi-step process. The first step was a hydride/dehydride process, substantially as described in the commonly assigned, U.S. Pat. No. 4,893,756, filed Sep. 22, 1988 of Michael A. Fetcenko, Thomas Kaatz, Steven P. Sumner, and Joseph A. LaRocca, for HYDRIDE REACTOR APPARATUS FOR HYDROGEN COMMINUTION OF METAL HYDRIDE HYDROGEN STORAGE ALLOY MATERIAL, and incorporated herein by reference. In this first step the hydrogen storage alloy ingot was reduced in size to −100 mesh.

The −100 mesh hydrogen storage alloy material obtained from the hydride/dehydride process was further reduced in size by impact milling. In the high speed impact milling process used to prepare the samples for the Examples described herein, the −100 mesh hydrogen storage alloy particles were tangentially and radially accelerated against an impact block. This was substantially as described in our commonly assigned, U.S. Pat. No. 4,915,898 filed Feb. 9, 1989, in the names of Merle Wolff, Mark A. Nuss, Michael A. Fetcenko, Andrea A. Lijoi, Steven P. Sumner, Joseph LaRocca, and Thomas Kaatz, for IMPROVED METHOD FOR THE CONTINUOUS FABRICATION OF COMMINUTED HYDROGEN STORAGE ALLOY NEGATIVE ELECTRODE MATERIAL, and incorporated herein by reference.

A fraction of hydrogen storage alloy material was recovered from the impact milling process. This fraction was minus 200 mesh, with a mass average particle size of about 400 mesh (38 micron).

The minus 200 mesh fraction of hydrogen storage alloy material powder was then bonded to a nickel screen current collector. Bonding was carried out by disposing a layer of the hydrogen storage alloy powder onto the current collector, and compacting the powder and current collector. Compacting was carried out under an inert atmosphere, with two compaction steps, each at a pressure of about 16 tons per square inch of current carrier. Thereafter the current collector and powder were sintered in an atmosphere of about 2 atomic percent $H_2$, balance argon.

TABLE I-1

| COMPOSITIONS |
|---|
| 1. $V_{22}Ti_{16}Zr_{16}Ni_{26}Cr_7Co_{15}$ |
| 2. $V_{19}Ti_{14}Zr_{14}Ni_{34}Cr_{20}$ |
| 3. $V_{19.6}Ti_{15}Zr_{15}Ni_{29}Cr_{5.6}Co_{6.6}Mn_{2.6}Al_{1.7}Fe_5$ |
| 4. $V_{22}Ti_{16}Zr_{16}Ni_{39}Fe_7$ |
| 5. $V_{25}Ti_{17}Zr_{17}Ni_{35}Co_7$ |
| 6. $V_{22}Ti_{16}Zr_{16}Ni_{34}Co_7Fe_6$ |
| 7. $V_{21}Ti_{15}Zr_{15}Ni_{31}Cr_6Fe_6Co_6$ |
| 8. $(V_{22}Ti_{16}Zr_{16}Ni_{39}Cr_7)_{95}Si_5$ |
| 9. $(V_{22}Ti_{16}Zr_{16}Ni_{39}Cr_7)_{95}Sn_5$ |
| 10. $(V_{22}Ti_{16}Zr_{16}Ni_{39}Cr_7)_{95}Zn_5$ |
| 11. $V_{20.2}Ti_{15.4}Zr_{14.5}Ni_{36.6}Cr_{4.8}Fe_{8.6}$ |
| 12. $V_{22}Ti_{16}Zr_{16}Ni_{39}Cr_7$ (Control) |

Example II

In this example sealed cells were fabricated to measure the effects of specific modifiers, modifier substitutions, and modifier combinations on midpoint cell voltage.

Negative electrode materials were prepared as described in Example I, above. The resulting negative electrodes were trimmed to size, and wound, with nylon separators and $Ni(OH)_2$ positive electrodes, to form "jelly rolls". These jelly rolls were then placed in "C" size cell cans, a 30 weight percent KOH electrolyte solution was added to each cell can, and the cells were sealed to form starved, sealed "C" cells.

Each of the cells were tested under identical conditions of a 7 Amp discharge. The midpoint cell voltages were recorded, and are reported in Table II-1.

Example III

The cells of Example II were also tested for capacity and the results shown in Table III-1 were obtained.

Example IV

Sealed cells of the type described in Examples II and III, hereinabove underwent life cycle testing. During each cycle the cells were charged at a charge current of 1.8 Amperes to a temperature cutoff, and then discharged at a discharge rate of 2.0 Amperes to a cutoff voltage of 1.0 volts. This test mode is especially aggressive. Even with compositions showing capacity loss, the addition of overcharge causes capacity to significantly increase. Thus, this example illustrates charging efficiency under cycle testing and is useful in the comparison of composition effects.

The results are shown in FIGS. 3a through 3k. The Figures are correlated with compositions in Table IV-1 below. Results for the alloy $V_{19}Ti_{14}Zr_{14}Ni_{34}Cr_{20}$ were not available.

TABLE II-1

ELECTRICAL PROPERTIES AS FUNCTION OF COMPOSITION

|  | MIDPOINT VOLTAGE | |
|---|---|---|
|  | 7 AMP | |
|  | A | B |
| 1. $V_{22}Ti_{16}Zr_{16}Ni_{26}Cr_7Co_{15}$ | 1.100 | 1.090 |
| 2. $V_{19}Ti_{14}Zr_{14}Ni_{34}Cr_{20}$ | | |
| 3. $V_{19.6}Ti_{15}Zr_{15}Ni_{29}Cr_{5.6}Co_{6.6}Mn_{2.6}Al_{1.7}Fe_5$ | 1.060 | 1.075 |
| 4. $V_{22}Ti_{16}Zr_{16}Ni_{39}Fe_7$ | 1.075 | 1.100 |
| 5. $V_{25}Ti_{17}Zr_{17}Ni_{35}Co_7$ | 1.085 | 1.090 |
| 6. $V_{22}Ti_{16}Zr_{16}Ni_{34}Co_7Fe_6$ | 1.103 | 1.090 |
| 7. $V_{21}Ti_{15}Zr_{15}Ni_{31}Cr_6Fe_6Co_6$ | 1.105 | 1.104 |
| 8. $(V_{22}Ti_{16}Zr_{16}Ni_{39}Cr_7)_{95}Si_5$ | 1.075 | 1.085 |
| 9. $(V_{22}Ti_{16}Zr_{16}Ni_{39}Cr_7)_{95}Sn_5$ | 1.020 | 1.060 |
| 10. $(V_{22}Ti_{16}Zr_{16}Ni_{39}Cr_7)_{95}Zn_5$ | 1.080 | 1.070 |
| 11. $V_{20.2}Ti_{15.4}Zr_{14.5}Ni_{36.6}Cr_{4.8}Fe_{8.6}$ | 1.04 | 0.97 |
| 12. $V_{22}Ti_{16}Zr_{16}Ni_{39}Cr_7$ (Control) | 1.048 | 1.05 |

TABLE III-1

ELECTRICAL PROPERTIES AS FUNCTION OF COMPOSITION

|  | ELECTRICAL CAPACITY | |
|---|---|---|
|  | 700 AMP | 2 AMP |
| 1. $V_{22}Ti_{16}Zr_{16}Ni_{26}Cr_7Co_{15}$ | 3.63 AH | 3.570 |
| 2. $V_{19}Ti_{14}Zr_{14}Ni_{34}Cr_{20}$ | 3.10 | 2.76 |
| 3. $V_{19.6}Ti_{15}Zr_{15}Ni_{29}Cr_{5.6}Co_{6.6}Mn_{2.6}Al_{1.7}Fe_5$ | 3.56 | 3.475 |
| 4. $V_{22}Ti_{16}Zr_{16}Ni_{39}Fe_7$ | 3.52 | 3.43 |
| 5. $V_{25}Ti_{17}Zr_{17}Ni_{35}Co_7$ | 3.57 | 3.50 |
| 6. $V_{22}Ti_{16}Zr_{16}Ni_{34}Co_7Fe_6$ | 3.55 | 3.43 |
| 7. $V_{21}Ti_{15}Zr_{15}Ni_{31}Cr_6Fe_6Co_6$ | 3.58 | 3.50 |
| 8. $(V_{22}Ti_{16}Zr_{16}Ni_{39}Cr_7)_{95}Si_5$ | 3.65 | 3.53 |
| 9. $(V_{22}Ti_{16}Zr_{16}Ni_{39}Cr_7)_{95}Sn_5$ | 3.65 | 3.50 |
| 10. $(V_{22}Ti_{16}Zr_{16}Ni_{39}Cr_7)_{95}Zn_5$ | 3.62 | 3.47 |
| 11. $V_{20.2}Ti_{15.4}Zr_{14.5}Ni_{36.6}Cr_{4.8}Fe_{8.6}$ | 3.58 | 3.40 |
| 12. $V_{22}Ti_{16}Zr_{16}Ni_{39}Cr_7$ (Control) | 3.64 | 3.44 |

TABLE IV-1

CORRELATION OF FIGURE NUMBERS WITH COMPOSITIONS

| Figure | Composition |
|---|---|
| 3a | $V_{22}Ti_{16}Zr_{16}Ni_{26}Cr_7Co_{15}$ |
| 3b | $V_{19.6}Ti_{15}Zr_{15}Ni_{29}Cr_{5.6}Co_{6.6}Mr_{2.6}Al_{1.7}Fe_5$ |
| 3c | $V_{22}Ti_{16}Zr_{16}Ni_{39}Fe_7$ |
| 3d | $V_{25}Ti_{17}Zr_{17}Ni_{35}Co_7$ |
| 3e | $V_{22}Ti_{16}Zr_{16}Ni_{34}Co_7Fe_6$ |
| 3f | $V_{21}Ti_{15}Zr_{15}Ni_{31}Cr_6Fe_6Co_6$ |
| 3g | $(V_{22}Ti_{16}Zr_{16}Ni_{39}Cr_7)_{95}Si_5$ |
| 3h | $(V_{22}Ti_{16}Zr_{16}Ni_{39}Cr_7)_{95}Sn_5$ |
| 3i | $(V_{22}Ti_{16}Zr_{16}Ni_{39}Cr_7)_{95}Zn_5$ |
| 3j | $V_{20.2}Ti_{15.4}Zr_{14.5}Ni_{36.6}Cr_{4.8}Fe_{8.6}$ |
| 3k | $V_{22}Ti_{16}Zr_{16}Ni_{39}Cr_7$ (Control) |

Example V

As discussed hereinabove, the instant inventors have found that alloys possessing a heavy V-Cr phase were often characterized by reduced electrochemical performance. This is believed to have occurred due to the hydrogen storing element (vanadium) is heavily concentrated in the V-Cr phase, being susceptible to oxidation and corrosion and rate dependent due to low concentration of catalyst. This significantly undermines the performance of any electrode fabricated from the alloy and of course reduces the cycle life of an electrochemical cell.

FIGS. 4a-4j are scanning electron photomicrographs of the alloy 1-12 set forth in Table I above. In these photomicrographs the V-Cr phase appears as large dark agglomerations randomly disposed throughout the matrix of the hydrogen storage alloy. This is particularly evident in for example FIG. 4b wherein the V-Cr is prevalent throughout the hydrogen storage alloy material. However, though compositional modification, it is possible to reduce, or even eliminate the presence of the V-Cr phase. (see for example FIGS. 4g and 4c). As demonstrated hereinabove, the improvements in alloy electrochemical performance are dramatic. Photomicrographs for the alloys $(V_{22}Ti_{16}Zr_{16}Ni_{39}Cr_7)_{95}Zr_5$ and $V_{20.2}Ti_{15.4}Zr_{14.5}Ni_{36.6}Cr_{4.8}Fe_{8.6}$ were not available.

While the invention has been described with respect to certain preferred exemplification and embodiment, it is not intended to limit the scope of the invention thereby, but solely by the claims appended hereto.

We claim:

1. A V-Ti-Zr-Ni-Cr electrochemical hydrogen storage alloy in which the V, Ti, Zr, Ni and Cr are individually or collectively partially replaced by one or more modifiers, and the alloy has the composition:

$$(V_{y'-y}Ni_yTi_{x'-x}Zr_xCr_z)_aM'_bM''_cM_d^{iii}M_e^{iv}$$

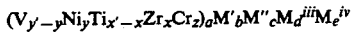

where x' is between 1.8 and 2.2, x is between 0 and 1.5, y' is between 3.6 and 4.4, y is between 0.6 and 3.5, z is between 0.00 and 1.44, a designates that the V-Ni-Ti-Zr-Cr component $(V_{y'-y}Ni_yTi_{x'-x}Zr_xCr_z)$, as a group, is at least 70 atomic present of the alloy, and M', M'', $M^{iii}$, and $M^{iv}$ are modifiers chosen from the group consisting of Al, Mo, W, Si, Sn, Zn and combinations thereof, and b, c, d, and e are modifier concentrations in the alloy and each of b, c, d, and e is from 0 to 20 atomic percent of the alloy, and the sum of b+c+d+e is an effective amount of modifiers up to 30 atomic percent of the alloy.

2. The V-Ti-Zr-Ni-Cr electrochemical hydrogen storage alloy of claim 1 having the composition within the homogenity range of $V_{19.6}Ti_{15}Zr_{15}Ni_{29}Cr_{5.6}Co_{6.6}Mn_{2.6}Al_{1.7}Fe_5$.

3. The V-Ti-Zr-Ni-Cr electrochemical hydrogen storage alloy of claim 1 having the composition within the homogenity range of $(V_{22}Ti_{16}Zr_{16}Ni_{39}Cr_7)_{95}Si_5$.

4. The V-Ti-Zr-Ni-Cr electrochemical hydrogen storage alloy of claim 1 having the composition within the homogenity range of $(V_{22}Ti_{16}Zr_{16}Ni_{39}Cr_7)_{95}Sn_5$.

5. The V-Ti-Zr-Ni-Cr electrochemical hydrogen storage alloy of claim 1 having the composition within the homogenity range of $(V_{22}Ti_{16}Zr_{16}Ni_{39}Cr_7)_{95}Zn_5$.

* * * * *

UNITED STATES PATENT AND TRADEMARK OFFICE
CERTIFICATE OF CORRECTION

PATENT NO. : 5,104,617
DATED : April 14, 1992
INVENTOR(S) : Fetcenko et al

It is certified that error appears in the above-indentified patent and that said Letters Patent is hereby corrected as shown below:

On the title page, Item [75], Inventors:, after "Stanford R. Ovshinsky, Bloomfield Hills, both of Mich." add the following inventor: --Kozo Kajita, Shiga, Japan.--

In the ABSTRACT at lines 9-10, replace "dericed" with --derived--.

At column 1, line 4, replace "behaviorssures" with --behavior--.

At column 1, line 61, replace "$e^{-(charging)}$." with --$e^-$-- and insert --charging-- on line 62.

At column 6, line 63, replace "from" with --form--.

At column 8, line 21, after "form" insert --on--.

At column 8, line 57, replace "θ" with --"--.

At column 8, replace lines 62-63 with --wherein $0.1 \leq a \leq 1.4$; $0.1 \leq b \leq 1.3$; $0.25 \leq c \leq 1.95$; $0.1 \leq d \leq 1.4$; $0.0 \leq x \leq 0.20$; $a + b + c + d = 3$; and M = Al, Si, V, Mn, Fe--.

UNITED STATES PATENT AND TRADEMARK OFFICE
CERTIFICATE OF CORRECTION

PATENT NO.   : 5,104,617
DATED        : April 14, 1992
INVENTOR(S)  : Fetcenko et al Page 2 of 4

It is certified that error appears in the above-indentified patent and that said Letters Patent is hereby corrected as shown below:

At column 9, line 4, replace "formula one" with --Formula 1--.

At column 9, replace lines 23-24 with --wherein $0.1 \leq a \leq 1.3$; $0.1 \leq b \leq 1.2$; $0.1 \leq c \leq 1.3$; $0.2 \leq d \leq 1.95$; $0.4 \leq a + b + c + d \leq 2.9$; $0.00 \leq x \leq 0.2$; and M=Al--.

At column 9, line 41, replace "improvemented" with --improved--.

At column 9, replace lines 54-55 with --wherein $0.1 \leq a \leq 1.3$; $0.1 \leq b \leq 1.3$; $0.25 \leq c \leq 1.95$; $0.6 \leq a + b + c \leq 2.9$; $0.0 \leq x \leq 0.2$; and wherein if x = 0--.

At column 9, line 62, replace "N" with --No--.

At column 10, replace lines 19-20 with --wherein $0.1 \leq a \leq 1.6$; $0.1 \leq b \leq 1.6$; $0.1 \leq c \leq 1.7$; $0.2 \leq d \leq 2.0$; $a + b + c + d = 3$; $0.0 \leq x \leq 0.2$; and M = Al, Si, Cr, Mn, Fe,--.

At column 12, line 41, replace "discloses" with --disclosed--.

At column 15, line 15, replace "graph" with --graphs--.

At column 15, last line, replace "$(V_{22}Ti_{16}Zr_{16}Ni_{39}Cr_7)_{95}M_5)_{95}M_5$" with

UNITED STATES PATENT AND TRADEMARK OFFICE
CERTIFICATE OF CORRECTION

PATENT NO. : 5,104,617
DATED : April 14, 1992
INVENTOR(S) : Fetcenko et al

It is certified that error appears in the above-indentified patent and that said Letters Patent is hereby corrected as shown below:

--$(V_{22}Ti_{16}Zr_{16}Ni_{39}Cr_7)_{95}M_5$--.

At column 16, line 4, replace "is" with --as--.

At column 18, line 53, replace "inventions" with --inventors--.

At column 18, line 56, after "V-Cr", insert --phase--.

At column 19, line 64, replace "providing" with --provide--.

At column 23, lines 9 and 30 delete "their".

UNITED STATES PATENT AND TRADEMARK OFFICE
CERTIFICATE OF CORRECTION

PATENT NO. : 5,104,617
DATED : April 14, 1992
INVENTOR(S) : Fetcenko et al

It is certified that error appears in the above-indentified patent and that said Letters Patent is hereby corrected as shown below:

At column 24, lines 5-6, replace "electrodein" with --electrode in--.

At column 24, line 13, after "compensated", insert --for--.

At column 25, line 16, replace "parameter" with --parameters--.

At column 30, line 4, replace "exemplification" with --exemplifications-- and "embodiment" with --embodiments--.

Signed and Sealed this

Twenty-fourth Day of August, 1993

Attest:

BRUCE LEHMAN

*Attesting Officer*  *Commissioner of Patents and Trademarks*